US012445751B2

(12) United States Patent
Miyauchi et al.

(10) Patent No.: US 12,445,751 B2
(45) Date of Patent: Oct. 14, 2025

(54) SOLID-STATE IMAGING DEVICE, METHOD FOR DRIVING SOLID-STATE IMAGING DEVICE, AND ELECTRONIC APPARATUS

(71) Applicant: Brillnics Singapore Pte. Ltd., Singapore (SG)

(72) Inventors: Ken Miyauchi, Tokyo (JP); Hideki Owada, Tokyo (JP); Kazuya Mori, Tokyo (JP); Isao Takayanagi, Tokyo (JP)

(73) Assignee: BRILLNICS SINGAPORE PTE. LTD., Singapore (SG)

( * ) Notice: Subject to any disclaimer, the term of this patent is extended or adjusted under 35 U.S.C. 154(b) by 18 days.

(21) Appl. No.: 18/221,260

(22) Filed: Jul. 12, 2023

(65) Prior Publication Data

US 2024/0022836 A1 Jan. 18, 2024

(30) Foreign Application Priority Data

Jul. 12, 2022 (JP) .................... 2022-111651

(51) Int. Cl.
*H04N 25/77* (2023.01)
*H04N 25/42* (2023.01)
(Continued)

(52) U.S. Cl.
CPC ............. *H04N 25/77* (2023.01); *H04N 25/42* (2023.01)

(58) Field of Classification Search
CPC ........ H04N 25/77; H04N 25/42; H04N 25/59; H04N 25/76; H04N 25/771; H04N 25/531; H04N 25/532; H04N 25/51; H04N 25/78
See application file for complete search history.

(56) References Cited

U.S. PATENT DOCUMENTS 6,697,111 B1    2/2004  Kozlowski et al.
8,723,284 B1 *  5/2014  Hynencek ............... H10F 39/80
                                                   257/447
(Continued)

FOREIGN PATENT DOCUMENTS

JP    2002501718 A    1/2002
JP    2005065074 A    3/2005
(Continued)

OTHER PUBLICATIONS

Toru Kondo et al.—"A 3D stacked CMOS image sensor with 16Mpixel global-shutter mode using a 4 million interconnections"—2015 International Image Sensor Society workshop.—URL: https://doi.org/10.60928/wBIv-21fb (Year: 2015).*
(Continued)

Primary Examiner — Marly S Camargo
(74) Attorney, Agent, or Firm — Pillsbury Winthrop Shaw Pittman LLP

(57) ABSTRACT

Provided are a solid-state imaging device, a method for driving a solid-state imaging device, and an electronic apparatus that are capable of selecting a pixel operating mode between a RS mode and a GS mode and switching a conversion gain read-out mode, where signals produced with different conversion gains are read, among several options depending on a scene. As a result, the solid-state imaging device, the method for driving the solid-state imaging device and the electronic apparatus can minimize a drop in SNR at the conjunction point between a HCG signal and a LCG signal and also achieve high full well capacity and little dark noise. In a solid-state imaging device, a pixel part includes pixels arranged in a matrix pattern, and each pixel includes a photoelectric conversion reading part. The solid-state imaging device is capable of performing rolling shutter (RS) and global shutter (GS).

28 Claims, 22 Drawing Sheets

(51) Int. Cl.
*H04N 25/531* (2023.01)
*H04N 25/532* (2023.01)
*H04N 25/59* (2023.01)
*H04N 25/76* (2023.01)
*H04N 25/771* (2023.01)
*H04N 25/78* (2023.01)

(56) References Cited

U.S. PATENT DOCUMENTS

| | | | |
|---|---|---|---|
| 10,312,282 B2* | 6/2019 | Kondo | H10F 39/809 |
| 11,323,644 B1 | 5/2022 | Innocent et al. | |
| 11,323,655 B2 | 5/2022 | Innocent et al. | |
| 12,108,180 B2* | 10/2024 | Miyauchi | H10F 39/18 |
| 12,243,900 B2* | 3/2025 | Ikuma | H10F 39/803 |
| 2005/0040485 A1 | 2/2005 | Kawahito | |
| 2005/0199813 A1 | 9/2005 | Van Bogget | |
| 2008/0192135 A1 | 8/2008 | Yamashita | |
| 2008/0266434 A1 | 10/2008 | Sugawa et al. | |
| 2013/0126710 A1* | 5/2013 | Kondo | H10F 39/803 |
| | | | 250/208.1 |
| 2020/0059589 A1* | 2/2020 | Liu | H04N 25/772 |
| 2021/0112212 A1 | 4/2021 | Oh | |
| 2022/0367557 A1 | 11/2022 | Ikuma et al. | |
| 2023/0054012 A1* | 2/2023 | Chevallier | G02F 1/15 |
| 2023/0156369 A1 | 5/2023 | Miyauchi | |
| 2024/0079439 A1* | 3/2024 | Lin | H04N 25/532 |
| 2024/0214707 A1* | 6/2024 | Mori | H04N 25/59 |

FOREIGN PATENT DOCUMENTS

| | | |
|---|---|---|
| JP | 2005328493 A | 11/2005 |
| JP | 2006505975 A | 2/2006 |
| WO | 2021/166584 A1 | 8/2021 |
| WO | 2021/201000 A1 | 10/2021 |

OTHER PUBLICATIONS

European Patent Office, Extended European Search Report issued in European Patent Application No. 23184993.6, Dec. 18, 2023.
Aoki et al., "A Rolling-Shutter Distortion-Free 3D Stacked Image Sensor with-160dB Parasitic Light Sensitivity In-Pixel Storage Node", IEEE International Solid-State Circuits Conference, Feb. 20, 2013, pp. 1-3.

* cited by examiner

SOLID-STATE IMAGING DEVICE, METHOD FOR DRIVING SOLID-STATE IMAGING DEVICE, AND ELECTRONIC APPARATUS

CROSS-REFERENCE TO RELATED APPLICATIONS

This application is based on and claims the benefit of priority from Japanese Patent Application Serial No. 2022-111651 (filed on Jul. 12, 2022), the contents of which are incorporated herein.

TECHNICAL FIELD

The present invention relates to a solid-state imaging device, a method for driving a solid-state imaging device, and an electronic apparatus.

BACKGROUND

Solid-state imaging devices (image sensors) including photoelectric conversion elements for detecting light and generating charges are embodied as CMOS (complementary metal oxide semiconductor) image sensors, which have been in practical use. The CMOS image sensors have been widely applied as parts of various types of electronic apparatuses such as digital cameras, video cameras, surveillance cameras, medical endoscopes, personal computers (PCs), automotive cameras, mobile phones and other portable terminals (mobile devices).

The CMOS image sensor includes, for each pixel, a photodiode (a photoelectric conversion element) and a floating diffusion (FD) amplifier having a floating diffusion (FD). The mainstream design of the reading operation in the CMOS image sensor is a column parallel output processing of selecting one of the rows in the pixel array and reading the pixels in the selected row simultaneously in the column output direction.

Each pixel of the CMOS image sensor generally includes, for one photodiode for example, four active elements: a transfer transistor serving as a transfer element; a reset transistor serving as a reset element; a source follower transistor serving as a source follower element (an amplification element); and a selection transistor serving as a selection element.

The transfer transistor remains selected and in the conduction state during a predetermined transfer period to transfer to the floating diffusion FD the charges (electrons) produced by the photoelectric conversion and then stored in the photodiode. The reset transistor remains selected and in the conduction state during a predetermined reset period to reset the floating diffusion FD to the potential of a power supply line. The selection transistor remains selected and in the conduction state during a read-out scan. Thus, the source follower transistor outputs, to the vertical signal line, a read-out signal of a column output generated by the conversion performed by the floating diffusion FD to a voltage signal.

For example, in a read-out scan period, the floating diffusion FD is reset to the potential of the power supply line (the reference potential) in a reset period, the charges in the floating diffusion FD are then converted into a voltage signal with a gain corresponding to the FD capacitance, and the voltage signal is output to the vertical signal line as a read-out reset signal Vrst of the reference level (a signal of the reference level). Subsequently, in a transfer period, the charges (electrons) produced by the photoelectric conversion and then stored in the photodiode are transferred to the floating diffusion FD. The charges of the floating diffusion FD are converted into a voltage signal with a gain corresponding to the FD capacitance, and the voltage signal is output to the vertical signal line as a read-out signal Vsig of the signal level (a signal of the signal level). The output signals from the pixel are subjected to the CDS (correlated double sampling) process in the form of a differential signal (Vsig−Vrst) in a column reading circuit.

As described above, an ordinary pixel read-out signal (hereinafter also referred to as "pixel signal") PS includes one read-out reset signal Vrst of the reference level and one read-out signal Vsig of the signal level.

The CMOS image sensor may sequentially scan the pixels or rows one-by-one to read the charges generated by photoelectric conversion and stored in the photodiodes. When such sequential scan is employed, in other words, a rolling shutter is employed as the electronic shutter, it is not possible to start and end the exposure for storing the charges produced by photoelectric conversion at the same time in all of the pixels. Therefore, the sequential scan has such a problem that, when a moving object is imaged, a captured image may experience distortion.

In a case where image distortion is not acceptable, for example, for the purposes of imaging a fast moving object and sensing that requires simultaneity among the captured images, a global shutter is employed as the electronic shutter. When the global shutter is employed, the exposure can be started and ended at the same timing in all of the pixels of the pixel array part.

In a CMOS image sensor employing a global shutter as the electronic shutter, a pixel has therein a signal holding part for holding, in a signal hold capacitor, a signal that is read out from a reading part, for example. The CMOS image sensor employing a global shutter samples and holds in an analog manner and stores the charges from the photodiodes in the signal hold capacitors of the signal holding parts at the same time in the form of voltage signals and subsequently sequentially read the voltage signals. In this way, the simultaneity is reliably achieved among the images (see, for example, J. Aoki, et al., "A Rolling-Shutter Distortion-Free 3D Stacked Image Sensor with −160 dB Parasitic Light Sensitivity In-Pixel Storage Node" ISSCC 2013/SESSION 27/IMAGE SENSORS/27.3.).

Each pixel is configured as, for example, a 4-transistor (4Tr) APS pixel (see, for example, Japanese Patent Application Publication No. 2005-65074 FIG. 2), or a capacitive trans-impedance amplifier (CTIA) pixel (see, for example, Japanese Patent Application Publication (Translation of PCT Application) No. 2006-505975 and Japanese Patent Application Publication (Translation of PCT Application) No. 2002-501718).

CMOS image sensors having a high dynamic range and high image quality include pixels with a global shutter function, which are typified by voltage mode global shutter (VMGS) pixels and charge mode global shutter (CMGS) pixels.

The VMGS pixels advantageously have higher shutter efficiency and lower parasitic light sensitivity (PLS) than the CMGS pixels.

In recent years, especially in the fields of machine vision and Internet Of Things (IoT), global shutter (GS) CMOS image sensors (CIS) are in increasing demand.

In these technical fields, there is also a strong need for single exposure high dynamic range (SEHDR) performance as well as the GS capability.

As described above, CMOS image sensors (CIS) can employ various characteristic structures in pixels for achieving an improved dynamic range.

As one of the approaches applied to increase the dynamic range, a lateral overflow integration capacitor (LOFIC) can be proposed (see, for example, Japanese Patent Application Publication No. 2005-328493).

When having the LOFIC configuration, the pixels have a storage capacitor serving as a storage capacitance element and a storage transistor serving as a storage connection element in addition to the above-listed basic constituents, so that overflow charges overflowing from the photodiode within the same exposure period are not wasted but stored in the storage capacitor.

The LOFIC pixel can have two types of conversion gains: the conversion gain determined by the capacitance Cfd1 of the floating diffusion (high gain: proportional to 1/Cfd1); and the conversion gain determined by the sum of the capacitance Cfd1 of the floating diffusion and the LOFIC capacitance Clofic of the storage capacitor C2 (low gain: proportional to 1/(Cfd1+Clofic)). In other words, the LOFIC pixels can achieve high full well capacity and low dark noise using low conversion gain (LCG) signals and high conversion gain (HCG) signals.

The LOFIC architecture, however, has serious issues, or faces a reduced SNR at the conjunction (combination) point of a high conversion gain (HCG) signal and a low conversion gain (LCG) signal. More specifically, the LOFIC architecture alone cannot remove kTC noise of the LCG signal, which results in a lower SNR at the conjunction point between the HCG signal and the LCG signal.

The high conversion gain (HCG) signal and the low conversion gain (LCG) signal have opposite signal directions. When the low conversion gain (LCG) is used to read the output signal from the pixel, the reset noise of the read-out reset signal VRL is different from the reset noise of the read-out luminance signal VSL. Therefore, subtraction process referred to as the differential double sampling (DDS) can hardly eliminate the reset noise.

SUMMARY

An object of the present invention is to provide a solid-state imaging device, a method for driving a solid-state imaging device, and an electronic apparatus that are capable of selecting a pixel operating mode between a rolling shutter mode and a global shutter mode and switching a conversion gain read-out mode, where signals produced with different conversion gains are read, among several options depending on a scene. As a result, the present invention can minimize a drop in SNR at the conjunction point between a high conversion gain (HCG) signal and a low conversion gain (LCG) signal and also achieve high full well capacity and little dark noise.

A first aspect of the present invention provides a solid-state imaging device including a pixel part having pixels arranged therein, each pixel including a photoelectric conversion reading part, each pixel being configured to operate in a rolling shutter mode and a global shutter mode; and a reading part for reading pixel signals from the pixel part. The photoelectric conversion reading part includes: a photoelectric conversion element for storing therein, in an integration period, charges generated by photoelectric conversion; a transfer element for transferring, in a transfer period following the integration period, the charges stored in the photoelectric conversion element; a floating diffusion to which the charges stored in the photoelectric conversion element are transferred through the transfer element; and a conversion signal reading part for amplifying a voltage signal produced through conversion with a conversion gain and outputting the amplified voltage signal, the conversion signal reading part being configured to operate in a first conversion gain read-out mode and a second conversion gain read-out mode, the conversion signal reading part being configured to, while operating in the first conversion gain read-out mode, produce a readable signal with at least one conversion gain associated with a capacitance of the floating diffusion and a first capacitance, and the conversion signal reading part being configured to, while operating in the second conversion gain read-out mode, produce a readable signal with at least one conversion gain associated with the capacitance of the floating diffusion, the first capacitance, and a second capacitance. The reading part is configured to switch whether the conversion signal reading part operates in the first conversion gain read-out mode or in the second conversion gain read-out mode depending on a scene.

A second aspect of the present invention provides a method for driving a solid-state imaging device including a pixel part having pixels arranged therein, each pixel including a photoelectric conversion reading part, each pixel being configured to operate in a rolling shutter mode and a global shutter mode; and a reading part for reading pixel signals from the pixel part. The photoelectric conversion reading part includes: a photoelectric conversion element for storing therein, in an integration period, charges generated by photoelectric conversion; a transfer element for transferring, in a transfer period following the integration period, the charges stored in the photoelectric conversion element; a floating diffusion to which the charges stored in the photoelectric conversion element are transferred through the transfer element; and a conversion signal reading part for amplifying a voltage signal produced through conversion with a conversion gain and outputting the amplified voltage signal. The solid-state imaging device is configured to operate (i) in a first conversion gain read-out mode where a readable signal is produced with at least one conversion gain associated with a capacitance of the floating diffusion and a first capacitance, and (ii) in a second conversion gain read-out mode where a readable signal is produced with at least one conversion gain associated with the capacitance of the floating diffusion, the first capacitance, and a second capacitance. Whether the solid-state imaging device operates in the first conversion gain read-out mode or in the second conversion gain read-out mode is switched depending on a scene.

A third aspect of the present invention provides an electronic apparatus including a solid-state imaging device; and an optical system for forming a subject image on the solid-state imaging device. The solid-state imaging device includes: a pixel part having pixels arranged therein, each pixel including a photoelectric conversion reading part, each pixel being configured to operate in a rolling shutter mode and a global shutter mode; and a reading part for reading pixel signals from the pixel part. The photoelectric conversion reading part includes: a photoelectric conversion element for storing therein, in an integration period, charges generated by photoelectric conversion; a transfer element for transferring, in a transfer period following the integration period, the charges stored in the photoelectric conversion element; a floating diffusion to which the charges stored in the photoelectric conversion element are transferred through the transfer element; and a conversion signal reading part for amplifying a voltage signal produced through conversion with a conversion gain and outputting the amplified voltage signal, the conversion signal reading part being configured to operate in a first conversion gain read-out mode and a second conversion gain read-out mode, the conversion signal reading part being configured to, while operating in the first conversion gain read-out mode, produce a readable signal with at least one conversion gain associated with a capacitance of the floating diffusion and a first capacitance, and the conversion signal reading part being configured to, while operating in the second conversion gain read-out mode, produce a readable signal with at least one conversion gain associated with the capacitance of the floating diffusion, the first capacitance, and a second capacitance. The reading part is configured to switch whether the conversion signal reading part operates in the first conversion gain read-out mode or in the second conversion gain read-out mode depending on a scene.

Advantageous Effects

According to the present invention, the pixel operating mode can be selected between the rolling shutter mode and the global shutter mode. In addition, the conversion gain read-out mode where signals produced with different conversion gains are read can be switched among several options depending on the scene. As a result, the present invention can minimize the drop in SNR at the conjunction point between the high conversion gain (HCG) signal and low conversion gain (LCG) signal and achieve high full well capacity and low dark noise.

DESCRIPTION OF THE PREFERRED EMBODIMENTS

Embodiments of the present invention will be hereinafter described with reference to the drawings.

First Embodiment

Figure 1:
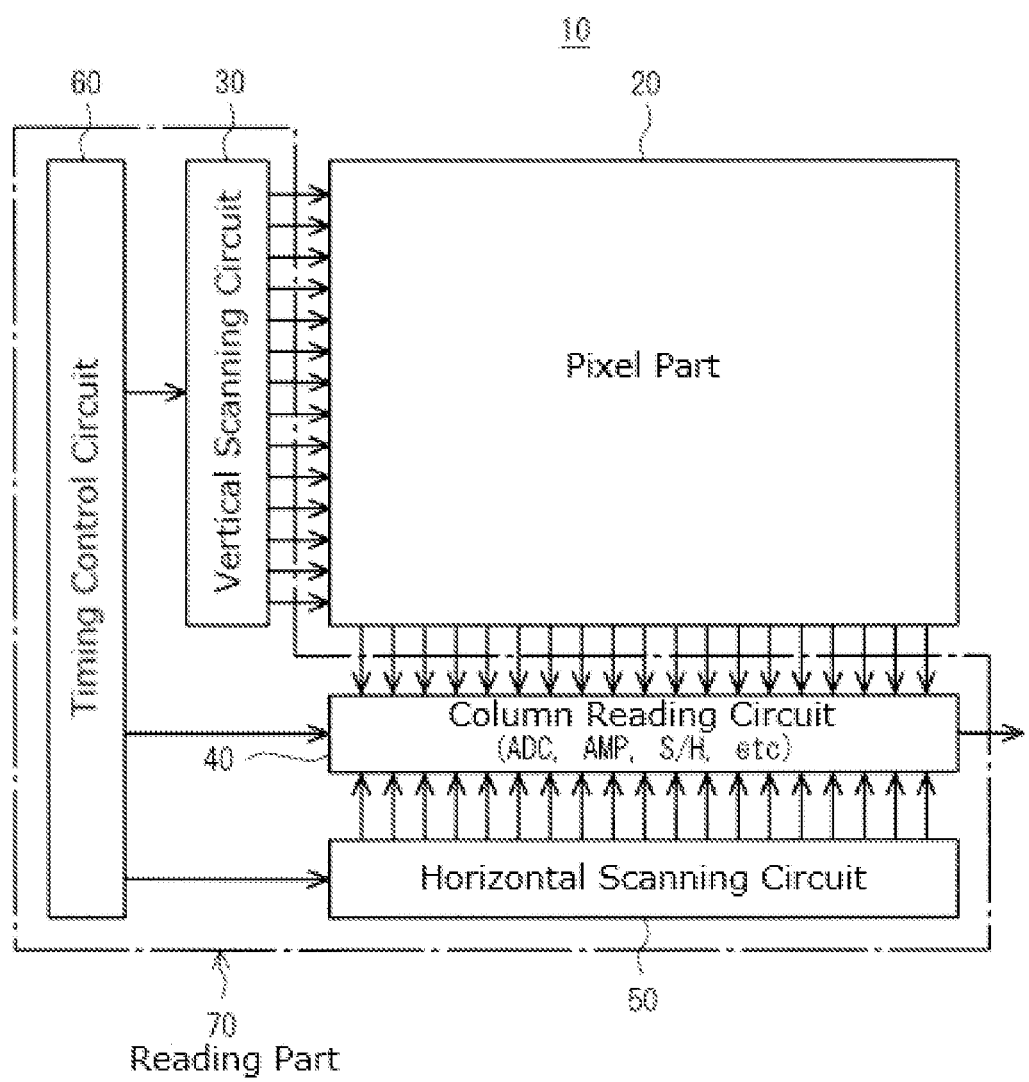
FIG. 1 is a block diagram showing an example configuration of a solid-state imaging device according to a first embodiment of the present invention.
Figure 2:
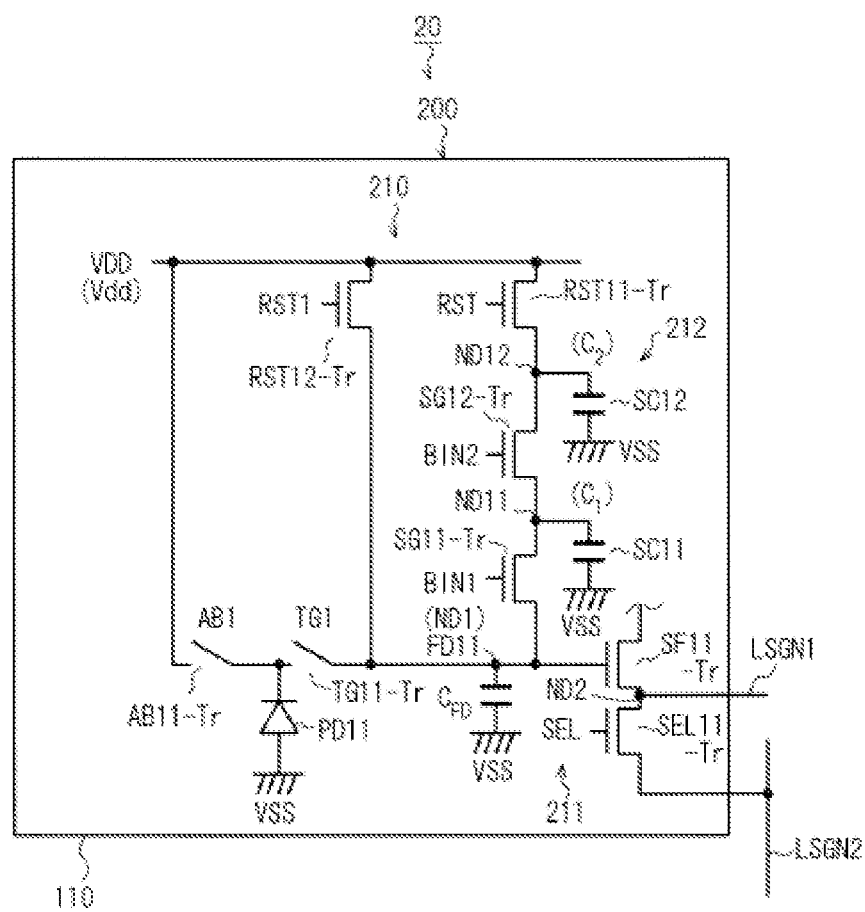
FIG. 2 is a circuit diagram showing an example configuration of a photoelectric conversion reading part of a pixel of the solid-state imaging device relating to the first embodiment of the present invention.
Figure 3:
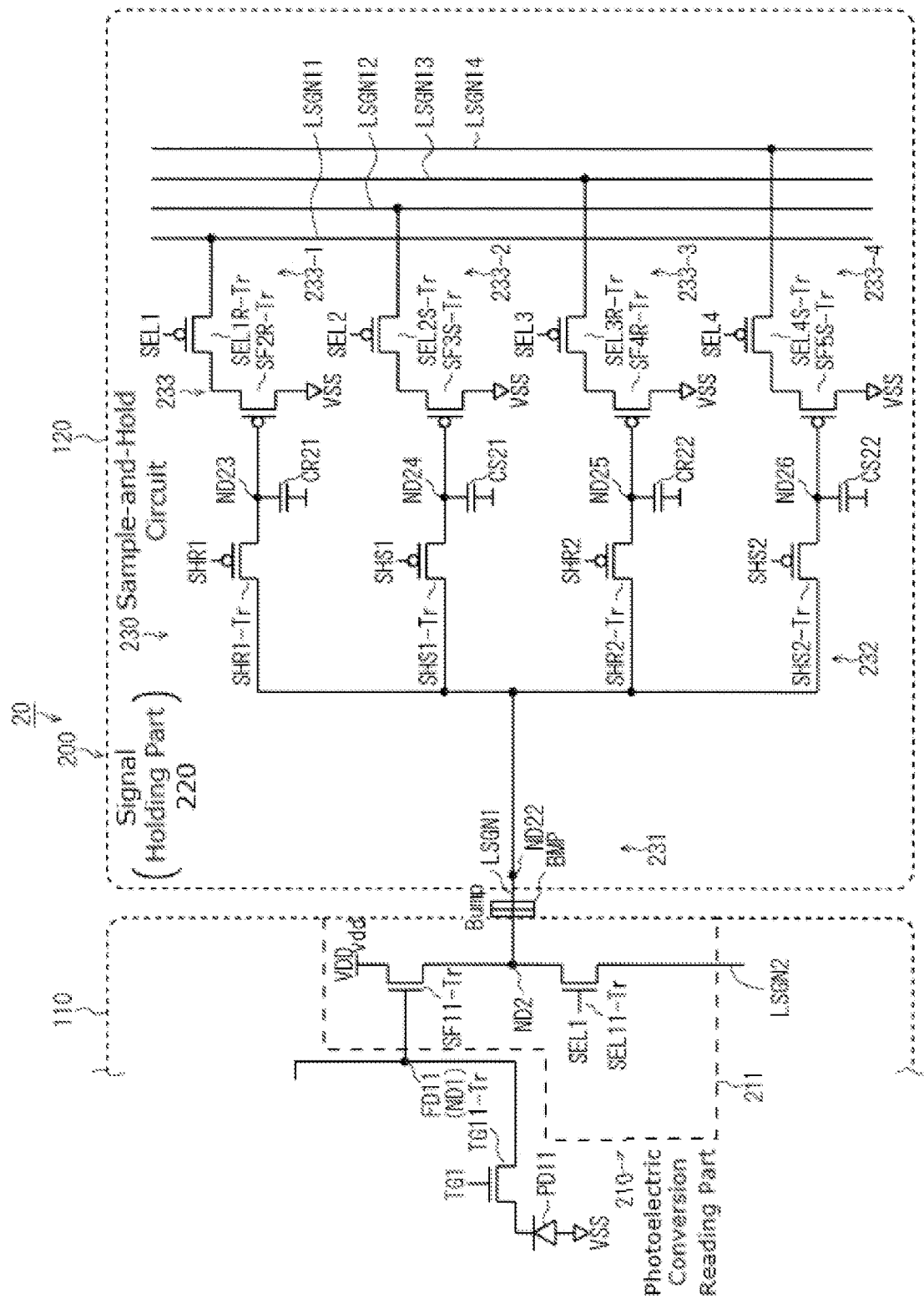
FIG. 3 is a circuit diagram showing an example configuration of a signal holding part of the pixel of the solid-state imaging device relating to the first embodiment of the present invention.

FIG. 1 is a block diagram showing an example configuration of a solid-state imaging device relating to a first embodiment of the present invention. FIG. 2 is a circuit diagram showing an example configuration of a photoelectric conversion reading part of a pixel of the solid-state imaging device relating to the first embodiment of the present invention. FIG. 3 is a circuit diagram showing an example configuration of a signal holding part of the pixel of the solid-state imaging device relating to the first embodiment of the present invention. In this embodiment, a solid-state imaging device 10 is constituted by, for example, a CMOS image sensor.

As shown in FIG. 1, the solid-state imaging device 10 is constituted mainly by a pixel part 20 serving as an image capturing part, a vertical scanning circuit (a row scanning circuit) 30, a reading circuit (a column reading circuit) 40, a horizontal scanning circuit (a column scanning circuit) 50, and a timing control circuit 60. Among these components, for example, the vertical scanning circuit 30, the reading circuit 40, the horizontal scanning circuit 50, and the timing control circuit 60 constitute a reading part 70 for reading out pixel signals.

In the first embodiment, the solid-state imaging device 10 has a pixel part including pixels 200 arranged therein in a matrix pattern. Each pixel 200 includes a photoelectric conversion reading part 210 and a signal holding part 220. The solid-state imaging device 10 is configured as a CMOS image sensor that is capable of performing a rolling shutter (RS) and a global shutter (GS), and selecting the pixel operation mode between the rolling shutter (RS) mode and the global shutter (GS) mode as desired. In addition, the solid-state imaging device 10 is capable of switching a conversion gain read-out mode, according to which signals produced with different conversion gains can be read, between several options depending on a scene. In this manner, the solid-state imaging device 10 is capable of minimizing a drop in SNR at the conjunction point between a high conversion gain (HCG) signal and a low conversion gain (LCG) signal and of achieving high full well capacity and little dark noise.

As shown in FIG. 2, the photoelectric conversion reading part 210 includes: a photodiode PD11 serving as a photoelectric conversion element for generating electric charges through photoelectric conversion and storing the generated charges in an integration period; a transfer transistor TG11-Tr serving as a transfer element for transferring the charges stored in the photodiode PD11 in a transfer period following the integration period; and a floating diffusion FD11 for receiving the charges stored in the photodiode PD11 that are transferred through the transfer transistor TG11-Tr.

The photoelectric conversion reading part 210 further includes a conversion signal reading part 211 capable of operating in a first conversion gain read-out mode CGRM1 and a second conversion gain read-out mode CGRM2. In the first conversion gain read-out mode CGRM1, the conversion signal reading part 211 is configured to read a signal produced with at least one conversion gain associated with a first capacitance C1 and the capacitance CFD of the floating diffusion FD11. In the second conversion gain read-out mode CGRM2, the conversion signal reading part 211 is configured to read a signal produced with at least one conversion gain associated with the capacitance CFD of the floating diffusion FD11, the first capacitance C1 and a second capacitance C2, which is sufficiently greater than the capacitances CFD and C1. The conversion signal reading part 211 is configured to amplify a voltage signal resulting from conversion with a conversion gain and outputs the amplified signal.

In the first embodiment, the pixel 200 is configured to produce a readable pixel signal with at least two conversion gains in the first conversion gain read-out mode CGRM1. The at least two conversion gains include, for example, a first high conversion gain (HCG1) and a first low conversion gain (LCG1). In this case, the pixel signal includes a read-out reset signal corresponding to a reset state and a read-out signal corresponding to the charges stored in the photodiode PD11. The first conversion gain read-out mode CGRM1 may be referred to as a dual conversion gain read-out mode. The pixel 200 is configured to produce a readable pixel signal with at least one conversion gain in the second conversion gain read-out mode CGRM2. The at least one conversion gain includes, for example, a second low conversion gain (LCG2). In this case, the pixel signal includes a read-out reset signal corresponding to a reset state and a read-out signal corresponding to the charges stored in the photodiode PD11 or to the overflow charges.

In the present embodiment, the reading part 70 can switch whether the solid-state imaging device 10 operates in the first conversion gain read-out mode CGRM1 or the second conversion gain read-out mode CGRM2 depending on a scene (for example, the level (intensity) of illuminance). In the first embodiment, the first conversion gain read-out mode (for example, dual conversion gain read-out mode) CGRM1 is selected for low to middle illuminance, and the second conversion gain read-out mode CGRM2 is selected for high illuminance. In this manner, the first embodiment can minimize a drop in SNR at the conjunction point between a high conversion gain (HCG) signal and a low conversion gain (LCG) signal and achieve high full well capacity and little dark noise.

In the present embodiment, the reading part 70 can switch between the first conversion gain read-out mode CGRM1 and the second conversion gain read-out mode CGRM2 when the solid-state imaging device 10 is operating in the rolling shutter (RS) mode.

While the solid-state imaging device 10 is operating in the rolling shutter (RS) mode, the reading part 70 selects the first conversion gain read-out mode CGRM1 if the illuminance of the scene is at least one of low illuminance or middle illuminance. While the solid-state imaging device 10 is operating in the rolling shutter (RS) mode, the reading part 70 selects the second conversion gain read-out mode CGRM2 if the illuminance of the scene is high illuminance.

(Basic Operation in Rolling Shutter Mode)

While the solid-state imaging device 10 is operating in the rolling shutter (RS) mode and in the first conversion gain read-out mode CGRM1, the reading part 70 is configured to basically set and switch between a first high conversion gain (HCG1) corresponding to the capacitance CFD of the floating diffusion FD11 and a first low conversion gain (LCG1) corresponding to the sum of the capacitance CFD of the floating diffusion FD11 and the first capacitance C1. While the solid-state imaging device 10 is operating in the rolling shutter (RS) mode and in the second conversion gain read-out mode CGRM2, the reading part 70 can set and switch over to a second low conversion gain (LCG2) corresponding to the sum of the capacitance of the floating diffusion CFD, the first capacitance C1 and the second capacitance C2. How to set and switch between the capacitances will be described below with reference to FIG. 2.

In the first conversion gain read-out mode CGRM1, the reading part 70 sequentially performs a first low conversion gain reset read-out operation LCG1-RST, a first high conversion gain reset read-out operation HCG1-RST, a first high conversion gain signal read-out operation HCG1-SIG, and a first low conversion gain signal read-out operation LCG1-SIG. In the second conversion gain read-out mode CGRM2, the reading part 70 sequentially performs a second low conversion gain signal read-out operation LCG2-SIG and a second low conversion gain reset read-out operation LCG2-RST.

In the second conversion gain read-out mode CGRM2, the reading part 70 keeps an intensified voltage level of the control signal for the transfer transistor TG11-Tr to make sure that the transfer transistor TG11-Tr remains in the non-conduction state, for example, keeps the voltage level of the control signal at a negative level (negative voltage) VM, in order to control the overflow charges during read-out, at least during the second low conversion gain signal read-out operation LCG2-SIG and during the second low conversion gain reset read-out operation LCG2-RST.

(Optional Operations in Rolling Shutter Mode)

The following describes four optional operations in the rolling shutter mode, for example.

(First Optional Operation in RS Mode)

A first optional operation is performed in a triple conversion gain (Triple-CG) mode corresponding to low- and middle-illuminance scenes. Specifically, while the solid-state imaging device 10 is operating in the rolling shutter (RS) mode and in the first conversion gain read-out mode CGRM1, the reading part 70 can set and switch between (i) the first high conversion gain HCG1 corresponding to the capacitance CFD of the floating diffusion FD11, (ii) a third low conversion gain LCG3 corresponding to the sum of the capacitance CFD of the floating diffusion FD11, the first capacitance C1 and the second capacitance C2, and (iii) a first medium conversion gain MCG1 corresponding to the sum of the capacitance CFD of the floating diffusion FD11 and the first capacitance C1. In the first conversion gain read-out mode CGRM1, the reading part 70 sequentially performs a third low conversion gain reset read-out operation LCG3-RST, a first medium conversion gain reset read-out operation MCG1-RST, a first high conversion gain reset read-out operation HCG1-RST, a first high conversion gain signal read-out operation HCG1-SIG, a first medium conversion gain signal read-out operation MCG1-SIG, and a third low conversion gain signal read-out operation LCG3-SIG.

This configuration can sufficiently achieve single frame single exposure high dynamic range (SEHDR) performance, thereby substantially realizing enhanced dynamic range.

(Second Optional Operation in RS Mode)

A second optional operation is performed in a LOFIC mode. Specifically, while the solid-state imaging device 10 is operating in the rolling shutter (RS) mode and in the second conversion gain read-out mode CGRM2, the reading part 70 can set and switch between (i) a second high conversion gain HCG2 corresponding to the capacitance CFD of the floating diffusion FD11 and (ii) a fourth low conversion gain LCG4 corresponding to the sum of the capacitance CFD of the floating diffusion FD11, the first capacitance C1 and the second capacitance C2. In the second conversion gain read-out mode CGRM2, the reading part 70 performs a second high conversion gain reset read-out operation HCG2-RST and a second high conversion gain signal read-out operation HCG2-SIG, and sequentially performs a fourth low conversion gain signal read-out operation LCG4-SIG and a fourth low conversion gain reset read-out operation LCG4-RST.

This configuration can sufficiently achieve single frame single exposure high dynamic range (SEHDR) performance, thereby substantially realizing enhanced dynamic range.

In the second conversion gain read-out mode CGRM2, the reading part 70 keeps an intensified voltage level of the control signal for the transfer transistor TG11-Tr to make sure that the transfer transistor TG11-Tr remains in the non-conduction state, for example, keeps the voltage level of the control signal at a negative level (negative voltage) VM, in order to control the overflow charges during read-out, at least during the fourth low conversion gain signal read-out operation LCG4-SIG and during the fourth low conversion gain reset read-out operation LCG4-RST.

(Third Optional Operation in RS Mode)

A third optional operation is performed in a mode using the overflow (OF) charges. Specifically, while the solid-state imaging device 10 is operating in the rolling shutter (RS) mode and in the second conversion gain read-out mode CGRM2, the reading part 70 can set and switch between (i) the second high conversion gain HCG2 corresponding to the capacitance CFD of the floating diffusion FD11 and (ii) the fourth low conversion gain LCG4 corresponding to the sum of the capacitance CFD of the floating diffusion FD11, the first capacitance C1 and the second capacitance C2. In the second conversion gain read-out mode CGRM2, the reading part 70 sequentially performs a fourth low conversion gain OF signal read-out operation LCG4-SIG and a fourth low conversion gain OF reset read-out operation LCG4-RST, and performs a second high conversion gain reset read-out operation HCG2-RST and a second high conversion gain signal read-out operation HCG2-SIG.

This configuration can achieve better saturation characteristics than the LOFIC configuration, due to the full well capacity of the photodiode PD.

In the second conversion gain read-out mode CGRM2, the reading part 70 keeps an intensified voltage level of the control signal for the transfer transistor TG11-Tr to make sure that the transfer transistor TG11-Tr remains in the non-conduction state, for example, keeps the voltage level of the control signal at a negative level (negative voltage) VM, in order to control the overflow charges during read-out, at least during the fourth low conversion gain OF signal read-out operation LCG4-SIG and during the fourth low conversion gain OF reset read-out operation LCG4-RST.

(Fourth Optional Operation in RS Mode)

A fourth optional operation is performed in a mode using dual conversion gain and low conversion gain. Specifically, while the solid-state imaging device 10 is operating in the rolling shutter (RS) mode and in the second conversion gain read-out mode CGRM2, the reading part 70 can set and switch between (i) the first high conversion gain HCG1 corresponding to the capacitance CFD of the floating diffusion FD11, (ii) a fourth low conversion gain LCG4 corresponding to the sum of the capacitance CFD of the floating diffusion FD11, the first capacitance C1 and the second capacitance C2, and (iii) a first medium conversion gain MCG1 corresponding to the capacitance CFD of the floating diffusion FD11 and the first capacitance C1. In the second conversion gain read-out mode CGRM2, the reading part 70 sequentially performs a first medium conversion gain reset read-out operation MCG1-RST, a first high conversion gain reset read-out operation HCG1-RST, a first high conversion gain signal read-out operation HCG1-SIG, a first medium conversion gain signal read-out operation MCG1-SIG, a fourth low conversion gain signal read-out operation LCG4-SIG, and a fourth low conversion gain reset read-out operation LCG4-RST.

In the second conversion gain read-out mode CGRM2, the reading part 70 keeps an intensified voltage level of the control signal for the transfer transistor TG11-Tr to make sure that the transfer transistor TG11-Tr remains in the non-conduction state, for example, keeps the voltage level of the control signal at a negative level (negative voltage) VM, in order to control the overflow charges during read-out, at least during the fourth low conversion gain signal read-out operation LCG4-SIG and during the fourth low conversion gain reset read-out operation LCG4-RST.

(Operations in Global Shutter Mode)

The following describes three operations performed in the global shutter (GS) mode, for example.

(First Operation in GS Mode)

When performing a first operation, the reading part 70 is capable of using the first capacitance C1 from among the first and second capacitances C1 and C2 to allow the pixel 200 to operate in the global shutter (GS) mode, and of setting and switching over to a fifth medium conversion gain MCG5 corresponding to the sum of the capacitance CFD of the floating diffusion FD11 and the first capacitance C1. In the global shutter (GS) mode, the reading part 70 sequentially performs a fifth medium conversion gain signal read-out operation MCG5-SIG and a fifth medium conversion gain reset read-out operation MCG5-RST.

When performing the first operation in the GS mode, the reading part 70 equalizes the reset levels of the floating diffusions FD11, then resets the floating diffusion FD11 and the first capacitance C1, and controls the stored charges to be transferred to the floating diffusion FD11 and the first capacitance C1 in the later half of the global shutter (GS) exposure period PEXP. Within a read-out waiting period PWRD, the reading part 70 resets the floating diffusion FD11 to eliminate the parasitic light sensitivity (PLS) of the floating diffusion FD11 while the first capacitance C1 is suspended (prevented) from being accessed.

The first operation can contribute to achieve both high full well capacity and global shutter (GS).

(Second Operation in GS Mode)

When performing a second operation, the reading part 70 is capable of using the first and second capacitances C1 and C2 to allow the pixel 200 to operate in the global shutter (GS) mode, and of setting and switching over to a fifth low conversion gain LCG5 corresponding to the sum of the capacitance CFD of the floating diffusion FD11, the first capacitance C1 and the second capacitance C2. In the global shutter (GS) mode, the reading part 70 sequentially performs a fifth low conversion gain signal read-out operation LCG5-SIG and a fifth low conversion gain reset read-out operation LCG5-RST.

When performing the second operation in the GS mode, the reading part 70 can control the stored charges to be transferred to the floating diffusion FD11, the first capacitance C1 and the second capacitance C2 in the later half of the global shutter (GS) exposure period PEXP. The reading part 70 resets the floating diffusion FD11 to eliminate the parasitic light sensitivity (PLS) of the floating diffusion FD11 within a read-out waiting period PWRD.

(Third Operation in GS Mode)

When performing a third operation, the reading part 70 is capable of using the first capacitance C1 from among the first and second capacitances C1 and C2 to allow the pixel 200 to operate in the global shutter (GS) mode, and of setting and switching over to a fifth high conversion gain HCG5 corresponding to the sum of the capacitance CFD of the floating diffusion FD11 and the first capacitance C1. In the global shutter (GS) mode, the reading part 70 sequentially performs a fifth high conversion gain signal read-out operation HCG5-SIG and a fifth high conversion gain reset read-out operation HCG5-RST.

When performing the third operation in the GS mode, the reading part 70 equalizes the reset levels of the floating diffusions FD11, then resets the floating diffusion FD11 and the first capacitance C1, and controls the stored charges to be transferred to the floating diffusion FD11 and the first capacitance C1 in the later half of the global shutter (GS) exposure period PEXP. The reading part 70 resets the floating diffusion FD11 to eliminate the parasitic light sensitivity (PLS) of the floating diffusion FD11 during a read-out waiting period PWRD while the first capacitance C1 is suspended (prevented) from being accessed.

According to the first, second and third operations, the PLS of the floating diffusion in a given pixel may be eliminated before pixel signals are read from a row of pixels including the given pixel and while the charges are held. Accordingly, shading can be reduced.

The photoelectric conversion reading part 210 includes: a first storage capacitor SC11 serving as a first capacitance element the capacitance of which serves as the first capacitance C1; a second storage capacitor SC12 serving as a second capacitance element the capacitance of which serves as the second capacitance C2; a first storage transistor SG11-Tr serving as a first storage connection element for selectively connecting the floating diffusion FD11 to the first capacitance element; and a second storage transistor SG12-Tr serving as a second storage connection element for selectively connecting the floating diffusion FD11 to the second capacitance element.

The above has briefly described the characteristic read-out operations performed by the solid-state imaging device 10 relating to the first embodiment in the rolling shutter (RS) and global shutter (GS) modes. The following outlines the configurations and functions of the parts of the solid-state imaging device 10. In particular, the configurations and functions of the photoelectric conversion reading part 210 and signal holding part 220 of each one of the pixels 200 arranged in the pixel part 20 and the relating read-out operation will be described in detail, and other features will be also described in detail.

(Configuration of Pixel 200)

As described above, FIGS. 2 and 3 show an example circuit configuration of the pixel 200 of the solid-state imaging device 10. More specifically, FIG. 2 is a circuit diagram showing an example configuration of the photoelectric conversion reading part of the pixel of the solid-state imaging device relating to the first embodiment of the present invention. FIG. 3 is a circuit diagram showing an example configuration of the signal holding part of the pixel of the solid-state imaging device relating to the first embodiment of the present invention.

The pixels 200 arranged in the pixel part 20 each include the photoelectric conversion reading part 210 and the signal holding part 220, as described above. The pixel part 20 relating to the first embodiment is configured as a stacked CMOS image sensor made up by a first substrate 110 and a second substrate 120, which will be described in detail below. In the present example, as shown in FIGS. 2 and 3, the photoelectric conversion reading part 210 is formed in the first substrate 110, and the signal holding part 220 is formed in the second substrate 120.

The photoelectric conversion reading part 210 of the pixel 200 includes a photodiode (a photoelectric conversion element) and an in-pixel amplifier.

The photodiode PD11 performs photoelectric conversion to generate charges and store the generated charges in an integration period. The transfer transistor TG11-Tr serving as the transfer element is connected between the photodiode PD11 and the floating diffusion FD11.

The photoelectric conversion reading part 210 relating to the first embodiment includes a shutter gate transistor AB11-Tr for allowing the diode PD11 to discharge charges. Stated differently, the photoelectric conversion reading part 210 relating to the first embodiment includes a shutter gate transistor AB11-Tr connected to the photodiode PD11 serving as the photoelectric conversion element. The shutter gate transistor AB11-Tr is configured to allow the photodiode PD11 to discharge charges toward a region other than the region where the floating diffusion FD11 is formed, for example, toward the power supply potential VDD (Vdd, VAAPIX).

The shutter gate transistor AB11-Tr of the photoelectric conversion reading part 210 is controlled by a control signal AB1 applied to the gate thereof through a control line. The first shutter gate transistor AB11-Tr remains selected and in the conduction state during a period in which the control signal AB1 is at the high (H) level, so that the charges (electrons) produced by conversion in the photodiode PD11 and stored in the photodiode PD11 can be discharged to the power supply potential VDD.

The photoelectric conversion reading part 210 includes, for one floating diffusion FD11 serving as the output node ND1, one first reset transistor RST11-Tr serving as a reset element, one source follower transistor SF11-Tr serving as a source follower element, one current transistor IC11-Tr serving as a current source element, one selection transistor SEL11-Tr serving as a selection element, one first storage transistor SG11-Tr serving as a first storage connection element, one first storage capacitor SC11 serving as a first storage capacitance element, one second storage transistor SG12-Tr serving as a second storage connection element, one second storage capacitor SC12 serving as a second storage capacitance element, one second reset transistor RST12-Tr serving as a second reset element, and one reading node ND2.

In the first embodiment, the source follower transistor SF11-Tr, the selection transistor SEL11-Tr, and the reading node ND2 (and also the current transistor IC11-Tr) together constitute the conversion signal reading part 211 serving as an output buffer part. The first storage transistor SG11-Tr, the storage capacitor SC11 serving as a first storage capacitance element, the second storage transistor SG12-Tr, and the storage capacitor SC12 serving as a second storage capacitance element together constitute a gain switching part 212.

In the photoelectric conversion reading part 210 relating to the first embodiment, the reading node ND2 of the conversion signal reading part 211 is connected to the input part of the signal holding part 220 via the internal signal line LSGN1 and to the vertical signal line LSGN2 via the selection transistor SEL11-Tr. In the global shutter (GS) mode, the conversion signal reading part 211 is configured to convert the charges in the floating diffusion FD11 serving as the output node into a voltage signal at a level corresponding to the amount of charges and outputs the voltage signal VSL to the signal holding part 220. In the rolling shutter (RS) mode, on the other hand, the conversion signal reading part 211 is configured to convert the charges in the floating diffusion FD11 serving as the output node into a voltage signal at a level corresponding to the amount of charges and outputs the voltage signal VSL to the vertical signal line LSGN2 via the selection transistor SEL11-Tr.

The photodiode PD11 generates signal charges (electrons) in an amount determined by the amount of the incident light and stores the same. Description will be hereinafter given of a case where the signal charges are electrons and each transistor is an n-type transistor. However, it is also possible that the signal charges are holes or each transistor is a p-type transistor. Further, this embodiment is also applicable to the case where a plurality of photodiodes and transfer transistors share the transistors.

The photodiode (PD) in each pixel 200 is a pinned photodiode (PPD). On a substrate surface for forming the photodiodes (PDs), there is a surface level due to dangling bonds or other defects, and therefore, a lot of charges (dark current) are generated due to heat energy, so that signals fail to be read out correctly. In the case of a pinned photodiode (PPD), a charge storage part of the photodiode (PD) is buried in the substrate to reduce mixing of the dark current into signals.

In the photoelectric conversion reading part 210, the transfer transistor TG11-Tr is connected between the photodiode PD11 and the floating diffusion FD11 and controlled by a control signal TG1 applied to the gate thereof through a control line. The transfer transistor TG11-Tr remains selected and in the conduction state during a transfer period PT in which the control signal TG1 is at the high (H) level, to transfer to the floating diffusion FD11 the charges (electrons) produced by the photoelectric conversion and then stored in the photodiode PD11.

After the photodiode PD11 and the floating diffusion FD11 are reset to a predetermined reset potential, the transfer transistor TG11-Tr enters the non-conduction state with the control signal TG1 being set to the low (L) level and the photodiode PD11 enters an integration period PI. Under these circumstances, if the intensity of the incident light is very high (the amount of the incident light is very large), the charges above the full well capacity overflow into the floating diffusion FD11 as overflow charges through the overflow path under the transfer transistor TG11-Tr. If the incident light has very high illuminance, for example, the charges above the full well capacity of the floating diffusion FD11 overflow to the first storage capacitor SC11 as overflow charges through the overflow path under the first storage transistor SG11-Tr.

The first reset transistor RST11-Tr is connected between the power supply line Vdd of the power supply voltage VDD and the floating diffusion FD11 and controlled by a control signal RST applied to the gate thereof through a control line. The first reset transistor RST11-Tr remains selected and in the conduction state during a reset period in which the control signal RST is at the H level, to reset the floating diffusion FD11, the first storage capacitor SC11, and the second storage capacitor SC12 to the potential of the power supply line Vdd of the power supply voltage VDD.

The first storage transistor SG11-Tr is connected between the floating diffusion FD11 and the second storage transistor SG12-Tr, and the first storage capacitor SC11 is connected between (i) the connection node ND11 between the first storage transistor SG11-Tr and the second storage transistor SG12-Tr and (ii) the reference potential VSS. The first storage transistor SG11-Tr is controlled by a control signal BIN1 applied to the gate thereof through a control line. The first storage transistor SG11-Tr remains selected and in the conduction state during a reset period in which the control signal BIN1 is at the H level so as to connect the floating diffusion FD11 and the first storage capacitor SC11.

The second storage transistor SG12-Tr is connected between the first storage transistor SG11-Tr and the first reset transistor RST11-Tr, and the second storage capacitor SC12 is connected between (i) the connection node ND12 between the second storage transistor SG12-Tr and the first reset transistor RST11-Tr and (ii) the reference potential VSS. The second storage transistor SG12-Tr is controlled by a control signal BIN2 applied to the gate thereof through a control line. The second storage transistor SG12-Tr remains selected and in the conduction state during a reset period in which the control signal BIN2 is at the H level so as to connect the floating diffusion FD11, the first storage capacitor SC11 and the second storage capacitor SC12.

The source follower transistor SF11-Tr serving as a source follower element is connected at the source thereof to the reading node ND2, at the drain thereof to the power supply line Vdd, and at the gate thereof to the floating diffusion FD11. The internal signal line LSGN1 between the reading node ND2 and the input part of the signal holding part 220 is driven by the current transistor serving as the current source element.

The drain and source of the selection transistor SEL11-Tr serving as a selection element are connected between the reading node ND2 and the vertical signal line LSGN2. The gate of the selection transistor SEL11-Tr is connected to the feeding line of a control signal SEL. The vertical signal line LSGN2 connected to the reading node ND2 via the selection transistor SEL11-Tr is driven by the current transistor serving as the current source element.

In the photoelectric conversion reading part 210, the source and drain of the second reset transistor RST12-Tr are connected between the power supply line (power supply potential) Vdd of the power supply voltage VDD and the floating diffusion FD11. The second reset transistor RST12-Tr is controlled by a control signal RST1 applied to the gate thereof through a control line. The second reset transistor RST12-Tr remains selected and in the conduction state during a reset period in which the control signal RST1 is at the H level, to reset the floating diffusion FD11 to the potential of the power supply line Vdd. In the rolling shutter mode, the control signal RST1 is fed at the L level, so that the second reset transistor RST2-Tr remains in the non-conduction state. The second reset transistor RST12-Tr thus does not reset the floating diffusion FD11. In the global shutter mode, the control signal RST1 is fed at the H level for a predetermined period of time within a read-out waiting period, so that the second reset transistor RST2-Tr remains in the conduction state. The second reset transistor RST12-Tr thus resets the floating diffusion FD11, so that the parasitic light sensitivity (PLS) of the floating diffusion FD11 is eliminated.

The signal holding part 220 is configured to acquire and hold the pixel signal, which is the voltage signal read onto the in-pixel signal line LSGN1 by the conversion signal reading part 211. In the first embodiment, the signal holding part 220 includes a sample-and-hold circuit 230 configured to capture and hold, in response to a sampling signal, the voltage signal. The voltage signal corresponds to the charges stored in the photodiode PD11 that have been transferred to the floating diffusion FD11 of the photoelectric conversion reading part 210 and is treated as a pixel signal read out onto the internal signal line LSGN1. Specifically, the sample-and-hold circuit 230 includes an input part 231, a sample-and-hold part 232, and an output part 233 (233-1 to 233-4). The sample-and-hold part 232 includes a sampling switch part 232-1 and a holding capacitor part 232-2. The sampling switch part 232-1 is configured to sample, in response to a sampling signal, two sets of pixel signals produced with different conversion gains, where each set of pixel signals includes a read-out reset signal and a read-out pixel signal. The holding capacitor part 232-2 includes holding capacitors (CS, CR) for holding in parallel the read-out pixel signals sampled by the sampling switch part 232-1. The output parts 233-1 to 233-4 are configured to selectively output, to vertical signal lines LSGN11 to 14, the read-out pixel signals held in the signal holding capacitor part 232-2.

The signal holding part 220 of the pixel 200 is constituted by the sample-and-hold circuit 230, as shown in FIG. 3. The sample-and-hold circuit 230 basically includes the input part 231 including the input node ND22, the sample-and-hold part 232, the output part 233, and holding nodes ND23, ND24, ND25 and ND26.

The input part 231 is connected to the reading node ND2 of the photoelectric conversion reading part 210 via the internal signal line LSGN1 and inputs, into the sample-and-hold part 232, the read-out signal (VSIG) and the read-out reset signal (VRST) output from the reading node ND2.

The sample-and-hold part 222 includes a first sampling transistor SHR1-Tr serving as a first switch element, a second sampling transistor SHS1-Tr serving as a second switch element, a third sampling transistor SHR2-Tr serving as a third switch element, a fourth sampling transistor SHS2-Tr serving as a fourth switch element, a first signal holding capacitor CR21, a second signal holding capacitor CS21, a third signal holding capacitor CR22, and a fourth signal holding capacitor CS22.

The first sampling transistor SHR1-Tr is connected between the holding node ND23 and the input node ND22 connected to the internal signal line LSGN1. The first sampling transistor SHR1-Tr keeps the first signal holding capacitor CR21 of the sample-and-hold part 232 selectively connected to the reading node ND2 of the photoelectric conversion reading part 210 via the holding node ND23 during a global shutter period or signal holding capacitor clear period. The first sampling transistor SHR1-Tr is in the conduction state during a period in which, for example, a control signal SHR1 is at the high level. The first signal holding capacitor CR21 is connected between the holding node ND23 and the reference potential VSS.

The second sampling transistor SHS1-Tr is connected between the holding node ND24 and the input node ND22 connected to the internal signal line LSGN1. The second sampling transistor SHS1-Tr keeps the second signal holding capacitor CS21 of the sample-and-hold part 232 selectively connected to the reading node ND2 of the photoelectric conversion reading part 210 via the holding node ND24 during a global shutter period or signal holding capacitor clear period. The second sampling transistor SHS1-Tr is in the conduction state during a period in which, for example, a control signal SHS1 is at the high level. The second signal holding capacitor CS21 is connected between the holding node ND24 and the reference potential VSS.

The third sampling transistor SHR2 Tr is connected between the holding node ND25 and the input node ND22 connected to the internal signal line LSGN1. The third sampling transistor SHR2-Tr keeps the third signal holding capacitor CR22 of the sample-and-hold part 232 selectively connected to the reading node ND2 of the photoelectric conversion reading part 210 via the holding node ND25 during a global shutter period or signal holding capacitor clear period. The third sampling transistor SHR2-Tr is in the conduction state during a period in which, for example, a control signal SHR2 is at the high level. The third signal holding capacitor CR22 is connected between the holding node ND25 and the reference potential VSS.

The fourth sampling transistor SHS2-Tr is connected between the holding node ND26 and the input node ND22 connected to the internal signal line LSGN1. The fourth sampling transistor SHS2-Tr keeps the fourth signal holding capacitor CS22 of the sample-and-hold part 232 selectively connected to the reading node ND2 of the photoelectric conversion reading part 210 via the holding node ND26 during a global shutter period or signal holding capacitor clear period. The fourth sampling transistor SHS2-Tr is in the conduction state during a period in which, for example, a control signal SHS2 is at the high level. The fourth signal holding capacitor CS22 is connected between the holding node ND26 and the reference potential VSS.

The first sampling transistor SHR1-Tr, the second sampling transistor SHS1-Tr, the third sampling transistor SHR2-Tr, and the fourth sampling transistor SHS2 Tr are formed by a MOS transistor, for example, a p-channel MOS (PMOS) transistor.

The output part 233 includes a first output part 233-1, a second output part 233-2, a third output part 233-3, and a fourth output part 233-4.

The first output part 233-1 includes a source follower transistor SF2R-Tr serving as a second source follower element for basically outputting the signal held in the first signal holding capacitor CR21 as a signal at a level determined by the held voltage in a global shutter period, and selectively outputs the held signal to the vertical signal line LSGN11 through a selection transistor SEL1R-Tr.

The source follower transistor SF2R-Tr and the selection transistor SEL1R-Tr are connected in series between the reference potential VSS and the vertical signal line LSGN11.

The gate of the source follower transistor SF2R-Tr is connected to the holding node ND23, and the selection transistor SEL1R-Tr is controlled by a control signal SEL1 applied to the gate thereof through a control line. The selection transistor SEL1R-Tr remains selected and in the conduction state during a selection period in which the control signal SEL1 is at the H level. In this way, the source follower transistor SF2R-Tr outputs, to the vertical signal line LSGN11, read-out voltage (VRST) of a column output corresponding to the voltage held in the first signal holding capacitor CR21.

The second output part 233-2 includes a source follower transistor SF3S-Tr serving as a third source follower element for basically outputting the signal held in the second signal holding capacitor CS21 as a signal at a level determined by the held voltage in a global shutter period, and selectively outputs the held signal through the selection transistor SEL2S-Tr, to the vertical signal line LSGN12.

The source follower transistor SF3S-Tr and the selection transistor SEL2S-Tr are connected in series between the reference potential VSS and the vertical signal line LSGN12.

The gate of the source follower transistor SF3S-Tr is connected to the holding node ND24, and the selection transistor SEL2S-Tr is controlled by a control signal SEL2 applied to the gate thereof through a control line. The selection transistor SEL2S-Tr remains selected and in the conduction state during a selection period in which the control signal SEL2 is at the H level. In this way, the source follower transistor SF3S-Tr outputs, to the vertical signal line LSGN12, read-out voltage (VSIG) of a column output corresponding to the voltage held in the second signal holding capacitor CS21.

The third output part 233-3 includes a source follower transistor SF4R-Tr serving as a fourth source follower element for basically outputting the signal held in the third signal holding capacitor CR22 as a signal at a level determined by the held voltage in a global shutter period, and selectively outputs the held signal to the vertical signal line LSGN13 through a selection transistor SEL3R-Tr.

The source follower transistor SF4R-Tr and the selection transistor SEL3R-Tr are connected in series between the reference potential VSS and the vertical signal line LSGN13.

The gate of the source follower transistor SF4R-Tr is connected to the holding node ND25, and the selection transistor SEL3R-Tr is controlled by a control signal SEL3 applied to the gate thereof through a control line. The selection transistor SEL3R-Tr remains selected and in the conduction state during a selection period in which the control signal SEL3 is at the H level. In this way, the source follower transistor SF4R-Tr outputs, to the vertical signal line LSGN13, read-out voltage (VRST) of a column output corresponding to the voltage held in the third signal holding capacitor CR22.

The fourth output part 233-4 includes a source follower transistor SF5S-Tr serving as a fifth source follower element for basically outputting the signal held in the fourth signal holding capacitor CS22 as a signal at a level determined by the held voltage in a global shutter period, and selectively outputs the held signal to the vertical signal line LSGN14 through a selection transistor SEL4S-Tr.

The source follower transistor SF5S-Tr and the selection transistor SEL4S-Tr are connected in series between the reference potential VSS and the vertical signal line LSGN14.

The gate of the source follower transistor SF5S-Tr is connected to the holding node ND26, and the selection transistor SEL4S-Tr is controlled by a control signal SEL4 applied to the gate thereof through a control line. The selection transistor SEL4S-Tr remains selected and in the conduction state during a selection period in which the control signal SEL4 is at the H level. In this way, the source follower transistor SF5S-Tr outputs, to the vertical signal line LSGN14, read-out voltage (VSIG) of a column output corresponding to the voltage held in the fourth signal holding capacitor CS22.

As described above, in the solid-state imaging device 10 relating to the first embodiment, in the voltage mode, the pixel signal is sampled into the signal holding part 220 serving as a pixel signal storage, which takes place in all of the pixels at the same time, and the signals obtained by converting the read-out signals held in the first, second, third and fourth signal holding capacitors CR21, CS21, CR22 and CS22 are read out to the vertical signal lines LSGN11 to 14 and fed to the column reading circuit 40.

In the pixel part 20, the first reset transistor RST11-Tr and the transfer transistor TG11-Tr are used to reset the photodiode, and this resetting is performed concurrently in all of the pixels. As a result, exposure to light starts concurrently in parallel in all of the pixels. After the exposure of a predetermined duration ends, the transfer transistor TG11-Tr is used to allow the signal holding part 220 to sample the output signal from the photoelectric conversion reading part 210. In this manner, the exposure ends concurrently in parallel in all of the pixels. This successfully accomplish a perfect electronic shutter.

The above describes only one example of the configuration of the signal holding part 220, and the signal holding part 220 can include a circuit of any configuration as long as the signal holding part 220 can hold, during a global shutter period, the read-out luminance signal (VSIG) and the read-out reset signal (VRST) output from the above-described photoelectric conversion reading part 210.

The vertical scanning circuit 30 drives the photoelectric conversion reading parts 210 and the signal retaining parts 220 of the pixels 200 through row-scanning control lines in shutter and reading rows, under control of the timing control circuit 60. Further, the vertical scanning circuit 30 outputs, according to an address signal, row selection signals indicating the row addresses of the reading row from which signals are to be read out and the shutter row in which the charges stored in the photodiodes PD are to be reset.

The column reading circuit 40 includes a plurality of column signal processing circuits (not shown) arranged so as to correspond to the column outputs from the pixel part 20, and the column reading circuit 40 may be configured such that the plurality of column signal processing circuits are capable of processing the columns in parallel. The column reading circuit 40 amplifies and AD converts, in the global shutter mode, the differential pixel signals Pixout (VSL) that are read out from the signal holding parts 220 of the pixels 200 to the vertical signal lines LSGN11 to 14.

The pixel signal Pixout (VSL) denotes a pixel read-out signal including a read-out signal VSIG and a read-out reset signal VRST that are read in the stated order from the pixel (in the present example, the photoelectric conversion reading part 210 and the signal holding part 220 of the pixel 200) in the global shutter mode.

In the solid-state imaging device 10 relating to the first embodiment, the column reading circuit 40 is configured such that the single circuit configuration can be used in any operational modes and for read-out signals of any signal types (single-ended or differential read-out signals).

The column reading circuit 40 includes an amplifier (AMP) and an analog to digital converter (ADC), for example.

The horizontal scanning circuit 50 scans the signals processed in the plurality of column signal processing circuits, for example, ADCs of the column reading circuit 40, transfers the signals in a horizontal direction, and outputs the signals to a signal processing circuit (not shown).

The timing control circuit 60 generates timing signals required for signal processing in the pixel part 20, the vertical scanning circuit 30, the reading circuit 40, the horizontal scanning circuit 50, and the like.

In the first embodiment, the reading part 70 activates the pixel array and the holding part array to read the pixel signals Pixout, for example, in the global shutter mode.

The reading part 70 performs read-out control corresponding to a specific mode operation in the rolling and global shutter modes. The reading part 70 is capable of selecting one of the first conversion gain read-out mode CGRM1 and the second conversion gain read-out mode CGRM2 depending on a scene.

The reading part 70 selects the first conversion gain read-out mode CGRM1 in the rolling shutter (RS) mode if the illuminance of the scene is at least one of low illuminance or middle illuminance, and selects the second conversion gain read-out mode CGRM2 in the rolling shutter (RS) mode if the illuminance of the scene is high illuminance.

<Read-Out Operation in Solid-State Imaging Device 10>

The above has described the characteristic configurations and functions of the parts of the solid-state imaging device 10. The following now briefly describes how the solid-state imaging device 10 relating to the first embodiment reads the pixel signals in the rolling shutter (RS) mode and the global shutter (GS) mode. In relation to the above, the following describes the five ways of reading the pixel signals in the rolling shutter mode and the three ways of reading the pixel signals in the global shutter mode with reference to corresponding timing charts.

(How to Read Pixel Signals in First Conversion Gain Read-Out Mode (Dual Conversion Gain Read-Out Mode) and in Second Conversion Gain Read-Out Mode (Low Conversion Gain Read-Out Mode) in RS Mode)

Figure 4:
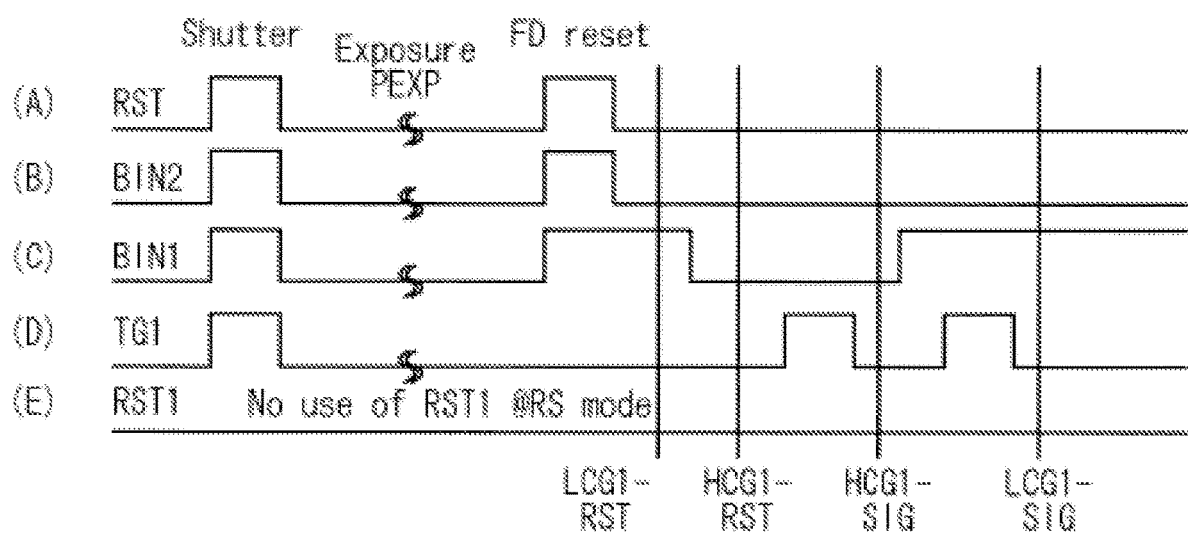
FIG. 4 is a timing chart to illustrate, as an example, a sequence of operations performed in a first conversion gain read-out mode (dual conversion gain read-out mode) in a rolling shutter mode to read the pixels in the solid-state imaging device relating to the first embodiment of the present invention.
Figure 5:
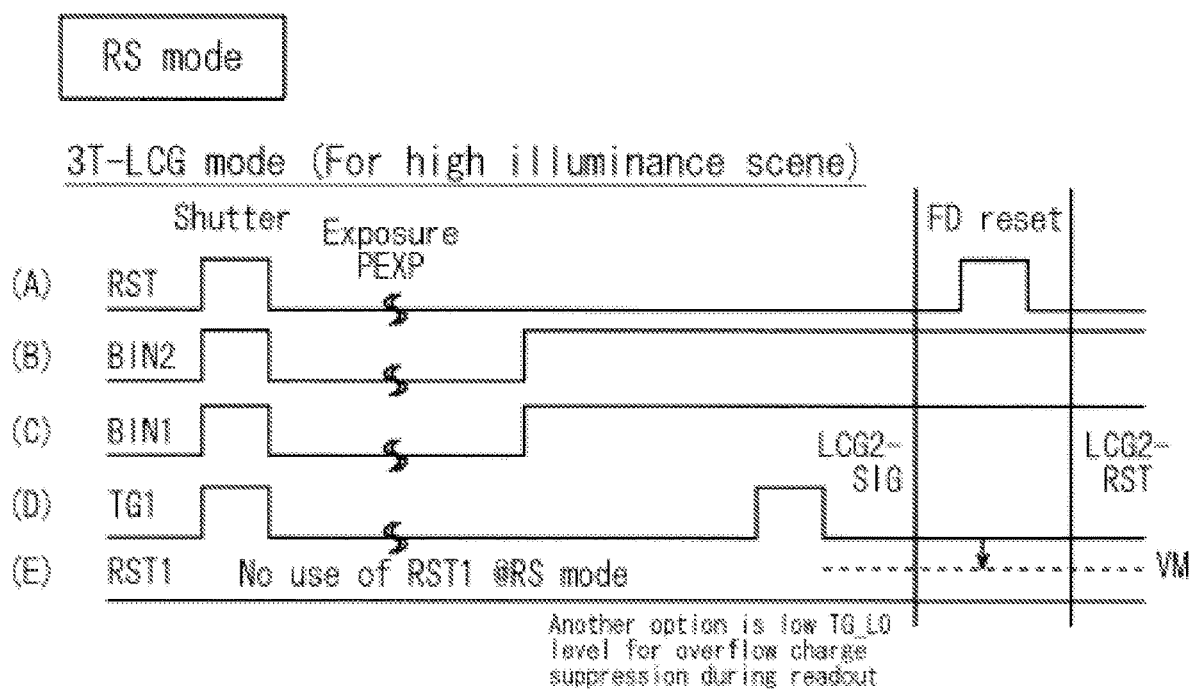
FIG. 5 is a timing chart to illustrate, as an example, a sequence of operations performed in a second conversion gain read-out mode (low conversion gain read-out mode) in a rolling shutter mode to read the pixels in the solid-state imaging device relating to the first embodiment of the present invention.

FIG. 4 is a timing chart including waveforms (A) to (E) to illustrate, as an example, a sequence of operations performed in the first conversion gain read-out mode (dual conversion gain read-out mode) in the rolling shutter mode to read the pixel signals from the pixels in the solid-state imaging device relating to the first embodiment of the present invention. FIG. 5 is a timing chart including waveforms (A) to (E) to illustrate, as an example, a sequence of operations performed in the second conversion gain read-out mode (low conversion gain read-out mode) in the rolling shutter mode to read the pixel signals from the pixels in the solid-state imaging device relating to the first embodiment of the present invention.

In FIGS. 4 and 5, the waveform (A) shows the control signal RST for the first reset transistor RST11-Tr, the waveform (B) shows the control signal BIN2 for the second storage transistor SG12-Tr, the waveform (C) shows the control signal BIN1 for the first storage transistor SG11-Tr, the waveform (D) shows the control signal TG1 for the transfer transistor TG11-Tr, and the waveform (E) shows the control signal RST1 for the second reset transistor RST12-Tr.

(How to Read Pixel Signals in First Conversion Gain Read-Out Mode (Dual Conversion Gain Read-Out Mode) in RS Mode)

The reading part 70 controls the first reset transistor RST11-Tr, the first storage transistor SG11-Tr, the second storage transistor SG12-Tr, and the transfer transistor TG11-Tr to remain in the conduction state for a predetermined period of time, so that the floating diffusion FD11, the first storage capacitor SC11, the second storage capacitor SC12 and the photodiode PD11 are reset. The reading part 70 subsequently controls the first reset transistor RST11-Tr, the first storage transistor SG11-Tr, the second storage transistor SG12-Tr and the transfer transistor TG11-Tr to remain in the non-conduction state, to start the exposure period PEXP. After the exposure period PEXP starts, the reading part 70 keeps the reset transistor RST11-Tr, the first storage transistor SG11-Tr and the second storage transistor SG12-Tr in the conduction state for a predetermined period of time, so that the floating diffusion FD11 is reset.

Following this, the reset transistor RST11-Tr is switched into the non-conduction state and the second storage transistor SG12-Tr is switched into the non-conduction state, so that the gain of the floating diffusion FD11 is set at the first low conversion gain LCG1 corresponding to the sum of the FD capacitance CFD and the first capacitance C1 of the first storage capacitor SC11. This allows the reading part to perform a first low conversion gain reset read-out operation LCG1-RST. Next, the storage transistor SG11-Tr is switched to the non-conduction state, so that the gain of the floating diffusion FD11 is set to the first high conversion gain HCG1 corresponding to the FD capacitance CFD. This allows the reading part 70 to perform a first high conversion gain reset read-out operation HCG1-RST.

After this, the reading part 70 controls the transfer transistor TG11-Tr to remain in the conduction state for a predetermined first transfer period, so that the charges stored in the photodiode PD11 are transferred to the floating diffusion FD11. The reading part 70 then switches the transfer transistor TG11-Tr into the non-conduction state in order to perform a first high conversion gain signal read-out operation HCG1-SIG in a first read-out period following the first transfer period. Next, the storage transistor SG11-Tr is switched to the conduction state, so that the gain of the floating diffusion FD11 is set to the first low conversion gain LCG1 corresponding to the sum of the FD capacitance CFD and the first capacitance C1 of the first storage capacitor SC11.

After this, the reading part 70 controls the transfer transistor TG11-Tr to remain in the conduction state for a predetermined second transfer period, so that the charges stored in the photodiode PD11 are transferred to the floating diffusion FD11. The reading part 70 then switches the transfer transistor TG11-Tr into the non-conduction state in order to perform a first low conversion gain signal read-out operation LCG1-SIG in a second read-out period following the second transfer period.

(How to Read Pixel Signals in Second Conversion Gain Read-Out Mode (Low Conversion Gain Read-Out Mode) in RS Mode)

In this case, the reading part 70 also controls the first reset transistor RST11-Tr, the first storage transistor SG11-Tr, the second storage transistor SG12-Tr, and the transfer transistor TG11-Tr to remain in the conduction state for a predetermined period of time, so that the floating diffusion FD11, the first storage capacitor SC11, the second storage capacitor SC12 and the photodiode PD11 are reset. The reading part 70 subsequently controls the first reset transistor RST11-Tr, the first storage transistor SG11-Tr, the second storage transistor SG12-Tr and the transfer transistor TG11-Tr to remain in the non-conduction state, to start the exposure period PEXP. After the exposure period PEXP starts, the reading part 70 keeps the reset transistor RST11-Tr in the non-conduction state and switches the first and second storage transistors SG11-Tr and SG12-Tr into the conduction state. The first and second storage transistors SG11-Tr and SG12-Tr remain in the conduction state for a period of time, so that the gain of the floating diffusion FD11 is set to the second low conversion gain in LCG2 corresponding to the sum of the FD capacitance CFD, the first capacitance C1 of the first storage capacitor SC11 and the second capacitance C2 of the second storage capacitor SC12.

After this, the reading part 70 controls the transfer transistor TG11-Tr to remain in the conduction state for a predetermined transfer period, so that the charges stored in the photodiode PD11 are transferred to the floating diffusion FD11. After this, the reading part 70 switches the transfer transistor TG11-Tr into the non-conduction state. In the second conversion gain read-out mode CGRM2, the reading part 70 keeps an intensified voltage level of the control signal for the transistor TG11-Tr to make sure that the transfer transistor TG11-Tr remains in the non-conduction state, for example, keeps the voltage level of the control signal at a negative level (negative voltage) VM, in order to control the overflow charges during read-out, at least during the second low conversion gain signal read-out operation LCG2-SIG and during the second low conversion gain reset read-out operation LCG2-RST.

The reading part 70 then performs a second low conversion gain signal read-out operation LCG2-SIG in a read-out period following the transfer period. After this, the reading part 70 switches the first reset transistor RST11-Tr into the conduction state, so that the floating diffusion FD11 is reset. The reading part 70 then switches the reset transistor RST11-Tr into the non-conduction state in order to perform a second low conversion gain reset read-out operation LCG2-RST in a subsequent read-out period.

(First Optional Operation in RS Mode)

Figure 6:
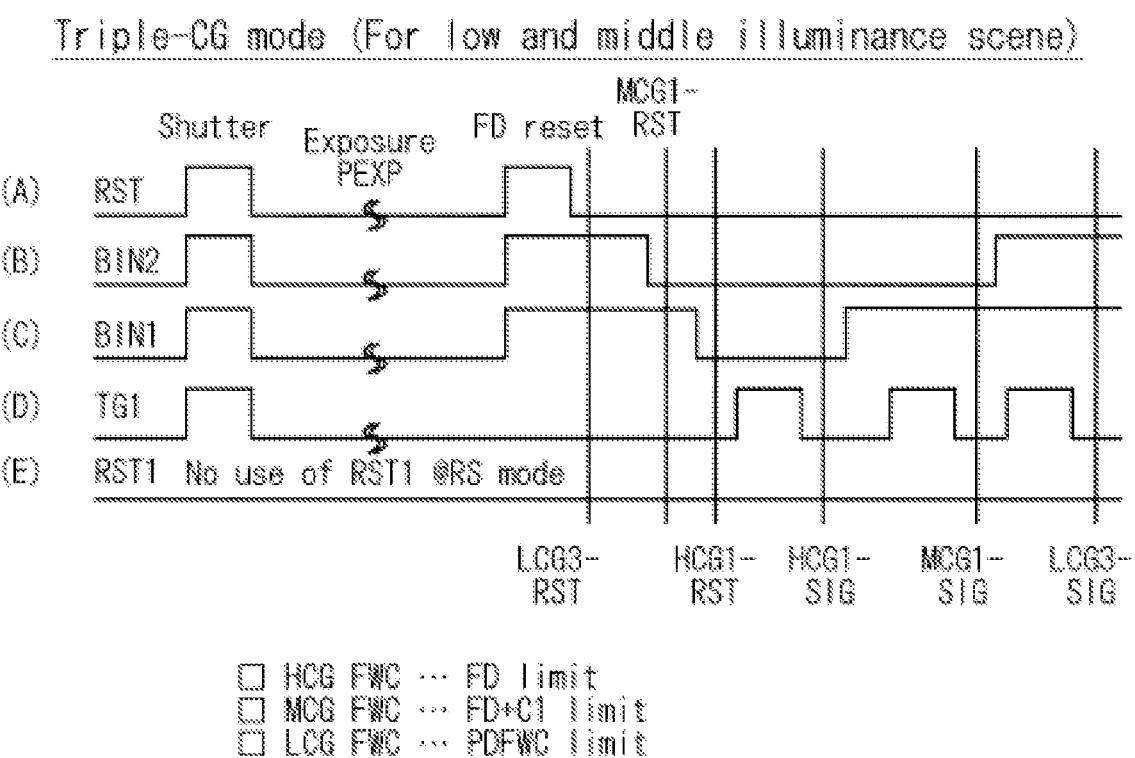
FIG. 6 is a timing chart to illustrate, as an example, a first optional operation performed in a rolling shutter mode to read the pixel in the solid-state imaging device relating to the first embodiment of the present invention.

FIG. 6 is a timing chart including waveforms (A) to (E) to illustrate an example of a first optional operation performed in the rolling shutter mode to read the pixel signal from the pixel in the solid-state imaging device relating to the first embodiment of the present invention.

In FIG. 6, the waveform (A) shows the control signal RST for the first reset transistor RST11-Tr, the waveform (B) shows the control signal BIN2 for the second storage transistor SG12-Tr, the waveform (C) shows the control signal BIN1 for the first storage transistor SG11-Tr, the waveform (D) shows the control signal TG1 for the transfer transistor TG11-Tr, and the waveform (E) shows the control signal RST1 for the second reset transistor RST12-Tr.

The reading part 70 controls the first reset transistor RST11-Tr, the first storage transistor SG11-Tr, the second storage transistor SG12-Tr, and the transfer transistor TG11-Tr to remain in the conduction state for a predetermined period of time, so that the floating diffusion FD11, the first storage capacitor SC11, the second storage capacitor SC12 and the photodiode PD11 are reset. The reading part 70 then controls the first reset transistor RST11-Tr, the first storage transistor SG11-Tr, the second storage transistor SG12-Tr and the transfer transistor TG11-Tr to remain in the non-conduction state, to start the exposure period PEXP. After the exposure period PEXP starts, the reading part 70 keeps the reset transistor RST11-Tr, the first storage transistor SG11-Tr and the second storage transistor SG12-Tr in the conduction state for a predetermined period of time, so that the floating diffusion FD11 is reset.

Next, the reset transistor RST11-Tr is switched into the non-conduction state, so that the gain of the floating diffusion FD11 is set to the third low conversion gain LCG3 corresponding to the sum of the FD capacitance CFD, the first capacitance C1 of the first storage capacitor SC11 and the second capacitance C2 of the second storage capacitor SC12. This allows the reading part 70 to perform a third low conversion gain reset read-out operation LCG3-RST. Next, the reading part 70 switches the second storage transistor SG12-Tr into the non-conduction state, so that the gain of the floating diffusion FD11 is set to the first medium conversion gain MCG1 corresponding to the sum of the FD capacitance CFD and the first capacitance C1 of the first storage capacitor SC11. This allows the reading part 70 to perform a first medium conversion gain reset read-out operation MCG1-RST. Next, the reading part 70 switches the first storage transistor SG11-Tr into the non-conduction state, so that the gain of the floating diffusion FD11 is set to the first high conversion gain HCG1 corresponding to the FD capacitance CFD. This allows the reading part 70 to perform a first high conversion gain reset read-out operation HCG1-RST.

After this, the reading part 70 controls the transfer transistor TG11-Tr to remain in the conduction state for a predetermined first transfer period, so that the charges stored in the photodiode PD11 are transferred to the floating diffusion FD11. The reading part 70 then switches the transfer transistor TG11-Tr into the non-conduction state in order to perform a first high conversion gain signal read-out operation HCG1-SIG in a first read-out period following the first transfer period.

Next, the first storage transistor SG11-Tr is switched into the conduction state, so that the gain of the floating diffusion FD11 is set to the first medium conversion gain MCG1 corresponding to the sum of the FD capacitance CFD and the first capacitance C1 of the first storage capacitor SC11. After this, the reading part 70 controls the transfer transistor TG11-Tr to remain in the conduction state for a predetermined second transfer period, so that the charges stored in the photodiode PD11 are transferred to the floating diffusion FD11. The reading part 70 then switches the transfer transistor TG11-Tr into the non-conduction state in order to perform a first medium conversion gain signal read-out operation MCG1-SIG in a second read-out period following the second transfer period.

Next, the second storage transistor SG12-Tr is switched into the conduction state, so that the gain of the floating diffusion FD11 is set to the third low conversion gain LCG3 corresponding to the sum of the FD capacitance CFD, the first capacitance C1 of the first storage capacitor SC11 and the second capacitance C2 of the second storage capacitor SC12. After this, the reading part 70 controls the transfer transistor TG11-Tr to remain in the conduction state for a predetermined third transfer period, so that the charges stored in the photodiode PD11 are transferred to the floating diffusion FD11. The reading part 70 then switches the transfer transistor TG11-Tr into the non-conduction state in order to perform a third low conversion gain signal read-out operation LCG3-SIG in a third read-out period following the third transfer period.

In the first optional operation, the FWC of the photodiode PD11 is greater than the FWC equal to the sum of the CFD and the C1. The first optional operation can thus effectively contribute to increase the dynamic range.

(Second Optional Operation in RS Mode)

Figure 7:
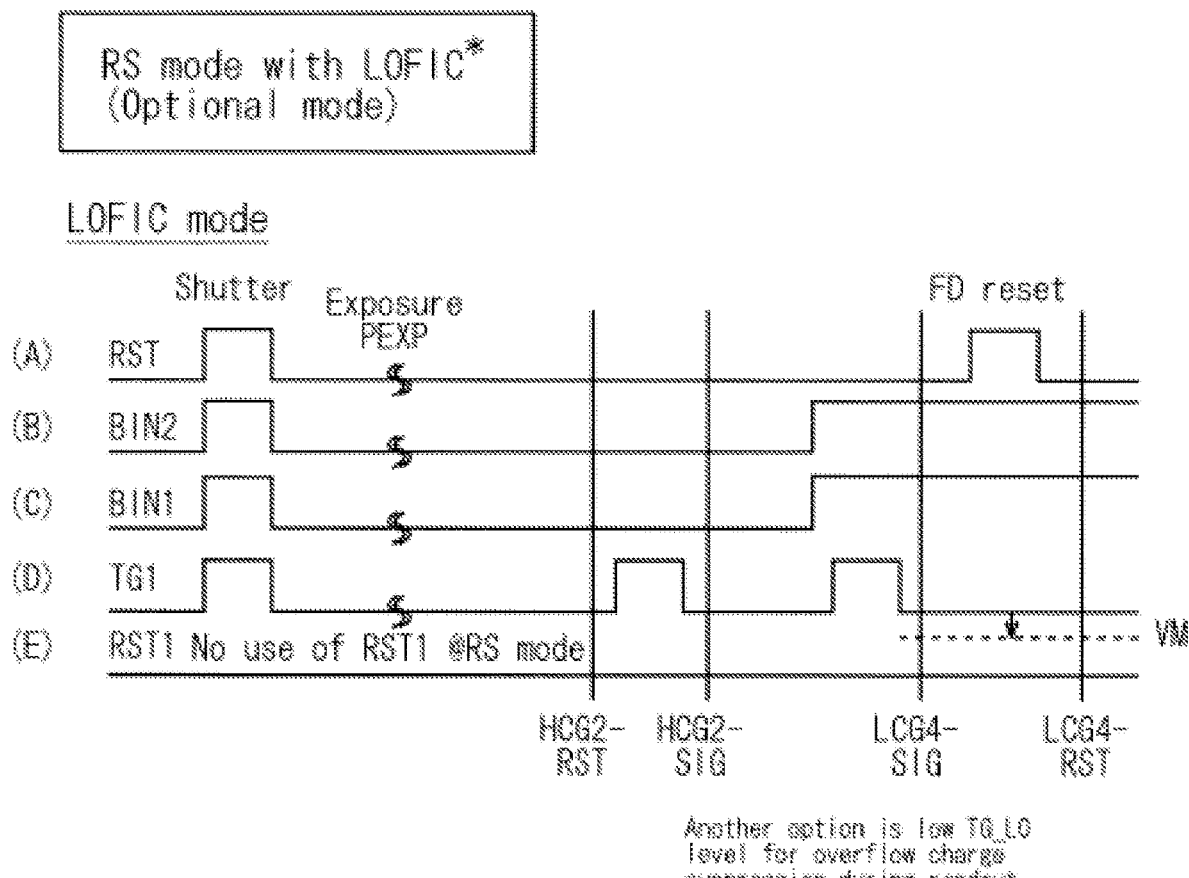
FIG. 7 is a timing chart to illustrate, as an example, a second optional operation performed in a rolling shutter mode to read the pixel in the solid-state imaging device relating to the first embodiment of the present invention.

FIG. 7 is a timing chart including waveforms (A) to (E) to illustrate an example of a second optional operation performed in the rolling shutter mode to read the pixel signal from the pixel in the solid-state imaging device relating to the first embodiment of the present invention.

In FIG. 7, the waveform (A) shows the control signal RST for the first reset transistor RST11-Tr, the waveform (B) shows the control signal BIN2 for the second storage transistor SG12-Tr, the waveform (C) shows the control signal BIN1 for the first storage transistor SG11-Tr, the waveform (D) shows the control signal TG1 for the transfer transistor TG11-Tr, and the waveform (E) shows the control signal RST1 for the second reset transistor RST12-Tr.

The reading part 70 controls the first reset transistor RST11-Tr, the first storage transistor SG11-Tr, the second storage transistor SG12-Tr, and the transfer transistor TG11-Tr to remain in the conduction state for a predetermined period of time, so that the floating diffusion FD11, the first storage capacitor SC11, the second storage capacitor SC12 and the photodiode PD11 are reset. The reading part 70 then controls the first reset transistor RST11-Tr, the first storage transistor SG11-Tr, the second storage transistor SG12-Tr and the transfer transistor TG11-Tr to remain in the non-conduction state, to start the exposure period PEXP.

After the exposure period PEXP starts, the reading part 70 keeps the reset transistor RST11-Tr, the first storage transistor SG11-Tr and the second storage transistor SG12-Tr in the non-conduction state, so that the floating diffusion FD11 remains in the reset state. Accordingly, the gain of the floating diffusion FD11 is set to the second high conversion gain HCG2 corresponding to the FD capacitance CFD. This allows the reading part 70 to perform a second high conversion gain reset read-out operation HCG2-RST.

After this, the reading part 70 controls the transfer transistor TG11-Tr to remain in the conduction state for a predetermined first transfer period, so that the charges stored in the photodiode PD11 are transferred to the floating diffusion FD11. The reading part 70 then switches the transfer transistor TG11-Tr into the non-conduction state in order to perform a second high conversion gain signal read-out operation HCG2-SIG in a first read-out period following the first transfer period.

The reading part 70 keeps the reset transistor RST11-Tr in the non-conduction state but switches the first and second storage transistors SG11-Tr and SG12-Tr into the conduction state, so that the gain of the floating diffusion FD11 is set to the third low conversion gain LCG3 corresponding to the sum of the FD capacitance CFD, the first capacitance C1 of the first storage capacitor SC11 and the second capacitance C2 of the second storage capacitor SC12.

After this, the reading part 70 controls the transfer transistor TG11-Tr to remain in the conduction state for a predetermined second transfer period, so that the charges stored in the photodiode PD11 are transferred to the floating diffusion FD11. After this, the reading part 70 switches the transfer transistor TG11-Tr into the non-conduction state. In the second conversion gain read-out mode CGRM2, the reading part 70 keeps an intensified voltage level of the control signal for the transfer transistor TG11-Tr to make sure that the transfer transistor TG11-Tr remains in the non-conduction state, for example, keeps the voltage level of the control signal at a negative level (negative voltage) VM, in order to control the overflow charges during read-out, at least during the third low conversion gain signal read-out operation LCG3-SIG and during the third low conversion gain reset read-out operation LCG3-RST.

The reading part 70 then performs a third low conversion gain signal read-out operation LCG3-SIG in a second read-out period following the second transfer period. After this, the reading part 70 switches the first reset transistor RST11-Tr into the conduction state, so that the floating diffusion FD11 is reset.

The reading part 70 then switches the reset transistor RST11-Tr into the non-conduction state in order to perform a third low conversion gain reset read-out operation LCG3-RST in the following read-out period.

(Third Optional Operation in RS Mode)

Figure 8:
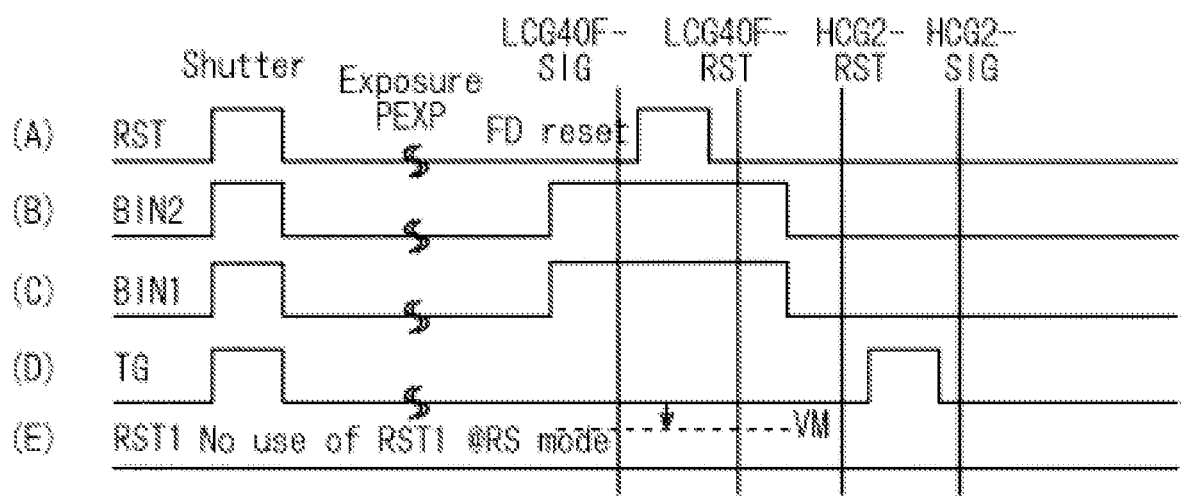
FIG. 8 is a timing chart to illustrate, as an example, a third optional operation performed in a rolling shutter mode to read the pixel in the solid-state imaging device relating to the first embodiment of the present invention.
Figure 9:
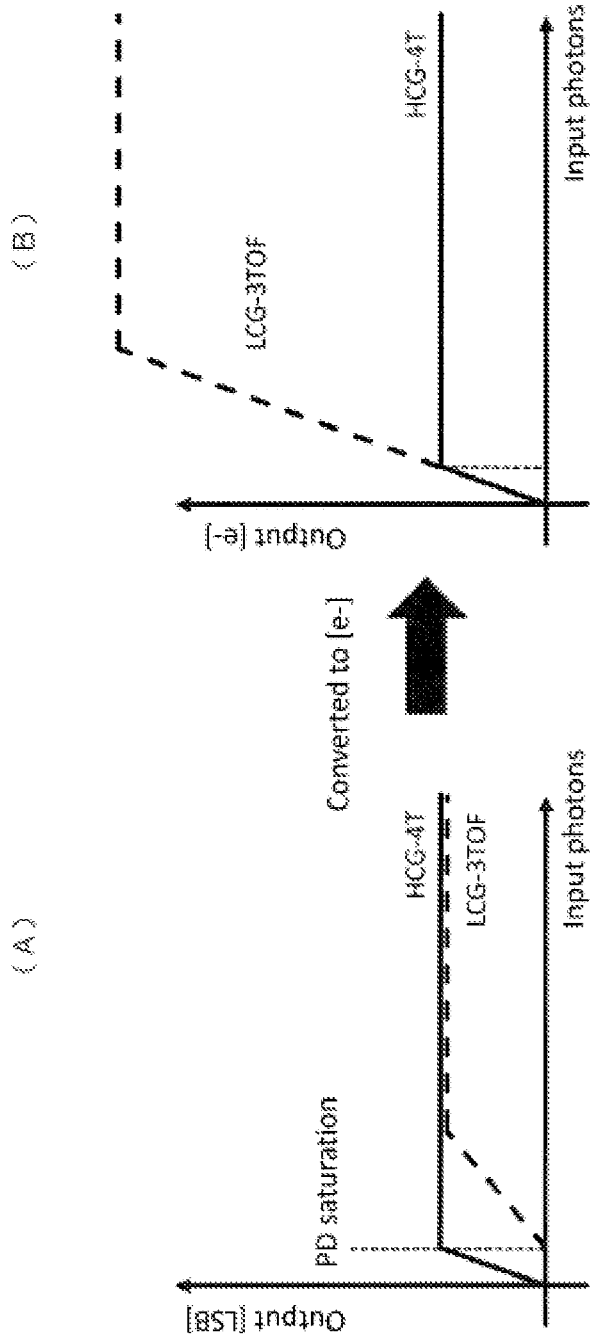
FIG. 9 shows photoelectric conversion characteristics observed in a conversion gain read-out mode with or without overflow charges when the third optional operation is performed in the solid-state imaging device relating to the first embodiment of the present invention.

FIG. 8 is a timing chart including waveforms (A) to (E) to illustrate an example of a third optional operation performed in the rolling shutter mode to read the pixel signal from the pixel in the solid-state imaging device relating to the first embodiment of the present invention. FIG. 9 includes graphs (A) and (B) showing photoelectric conversion characteristics observed during conversion gain read-out with or without overflow charges when the third optional operation is performed in the solid-state imaging device relating to the first embodiment of the present invention.

In FIG. 8, the waveform (A) shows the control signal RST for the first reset transistor RST11-Tr, the waveform (B) shows the control signal BIN2 for the second storage transistor SG12-Tr, the waveform (C) shows the control signal BIN1 for the first storage transistor SG11-Tr, the waveform (D) shows the control signal TG1 for the transfer transistor TG11-Tr, and the waveform (E) shows the control signal RST1 for the second reset transistor RST12-Tr.

The reading part 70 controls the first reset transistor RST11-Tr, the first storage transistor SG11-Tr, the second storage transistor SG12-Tr, and the transfer transistor TG11-Tr to remain in the conduction state for a predetermined period of time, so that the floating diffusion FD11, the first storage capacitor SC11, the second storage capacitor SC12 and the photodiode PD11 are reset. The reading part 70 then controls the first reset transistor RST11-Tr, the first storage transistor SG11-Tr, the second storage transistor SG12-Tr and the transfer transistor TG11-Tr to remain in the non-conduction state, to start the exposure period PEXP.

After the exposure period PEXP starts, the reading part 70 keeps the reset transistor RST11-Tr in the non-conduction state but switches the first and second storage transistors SG11-Tr and SG12-Tr into the conduction state, and the first and second storage transistors SG11-Tr and SG12-Tr remain in the conduction state for a period of time. As a result, the gain of the floating diffusion FD11 is set to the third low conversion gain LCG3 corresponding to the sum of the FD capacitance CFD, the first capacitance C1 of the first storage capacitor SC11 and the second capacitance C2 of the second storage capacitor SC12.

In the second conversion gain read-out mode CGRM2, the reading part 70 keeps an intensified voltage level of the control signal for the transfer transistor TG11-Tr to make sure that the transfer transistor TG11-Tr remains in the non-conduction state, for example, keeps the voltage level of the control signal at a negative level (negative voltage) VM, in order to control the overflow charges during read-out, at least during the third low conversion gain signal read-out operation LCG3-SIG and during the third low conversion gain reset read-out operation LCG3-RST.

After this, the reading part 70 performs a third low conversion gain overflow (OF) signal read-out operation LCG3OF-RST. After this, the reading part 70 switches the first reset transistor RST11-Tr into the conduction state, so that the floating diffusion FD11 is reset.

The reading part 70 then switches the reset transistor RST11-Tr into the non-conduction state in order to perform a third low conversion gain OF reset read-out operation LCG3OF-RST in the following read-out period.

Next, the reading part 70 switches the first storage transistor SG11-Tr and the second storage transistor SG12-Tr into the non-conduction state, so that the gain of the floating diffusion FD11 is set to the second high conversion gain HCG2 corresponding to the FD capacitance CFD. This allows the reading part 70 to perform a second high conversion gain reset read-out operation HCG2-RST.

After this, the reading part 70 controls the transfer transistor TG11-Tr to remain in the conduction state for a predetermined transfer period, so that the charges stored in the photodiode PD11 are transferred to the floating diffusion FD11. The reading part 70 then switches the transfer transistor TG11-Tr into the non-conduction state in order to perform a second high conversion gain signal read-out operation HCG2-SIG in a read-out period following the transfer period.

The third optional operation can achieve high full well capacity and low dark noise using the low conversion gain (LCG) signals and high conversion gain (HCG) signals.

(Fourth Optional Operation in RS Mode)

Figure 10:
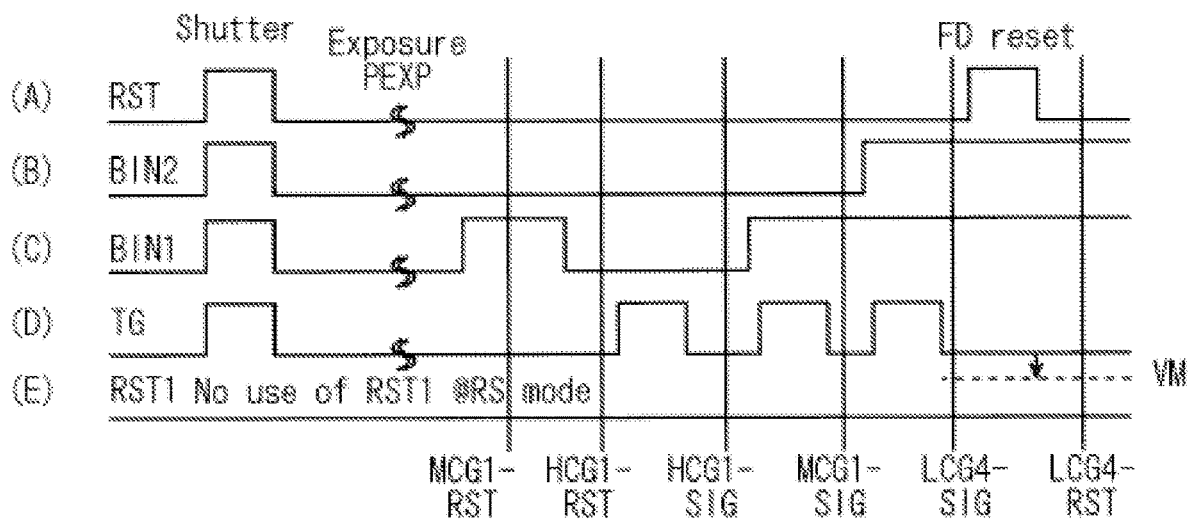
FIG. 10 is a timing chart to illustrate, as an example, a fourth optional operation performed in a rolling shutter mode to read the pixel in the solid-state imaging device relating to the first embodiment of the present invention.

FIG. 10 is a timing chart including waveforms (A) to (E) to illustrate an example of a fourth optional operation performed in the rolling shutter mode to read the pixel signal from the pixel in the solid-state imaging device relating to the first embodiment of the present invention.

In FIG. 10, the waveform (A) shows the control signal RST for the first reset transistor RST11-Tr, the waveform (B) shows the control signal BIN2 for the second storage transistor SG12-Tr, the waveform (C) shows the control signal BIN1 for the first storage transistor SG11-Tr, the waveform (D) shows the control signal TG1 for the transfer transistor TG11-Tr, and the waveform (E) shows the control signal RST1 for the second reset transistor RST12-Tr.

The reading part 70 controls the first reset transistor RST11-Tr, the first storage transistor SG11-Tr, the second storage transistor SG12-Tr, and the transfer transistor TG11-Tr to remain in the conduction state for a predetermined period of time, so that the floating diffusion FD11, the first storage capacitor SC11, the second storage capacitor SC12 and the photodiode PD11 are reset. The reading part 70 then controls the first reset transistor RST11-Tr, the first storage transistor SG11-Tr, the second storage transistor SG12-Tr and the transfer transistor TG11-Tr to remain in the non-conduction state, to start the exposure period PEXP. After the exposure period PEXP starts, the reading part 70 keeps the first storage transistor SG11-Tr in the conduction state for a predetermined period of time, so that the gain of the floating diffusion FD11 is set to the first medium conversion gain MCG1 corresponding to the sum of the FD capacitance CFD and the first capacitance C1 of the first storage capacitor SC11. This allows the reading part 70 to perform a first medium conversion gain reset read-out operation MCG1-RST. Next, the reading part 70 switches the first storage transistor SG11-Tr into the non-conduction state, so that the gain of the floating diffusion FD11 is set to the first high conversion gain HCG1 corresponding to the FD capacitance CFD. This allows the reading part 70 to perform a first high conversion gain reset read-out operation HCG1-RST.

After this, the reading part 70 controls the transfer transistor TG11-Tr to remain in the conduction state for a predetermined first transfer period, so that the charges stored in the photodiode PD11 are transferred to the floating diffusion FD11. The reading part 70 then switches the transfer transistor TG11-Tr into the non-conduction state in order to perform a first high conversion gain signal read-out operation HCG1-SIG in a first read-out period following the first transfer period.

Next, the first storage transistor SG11-Tr is switched into the conduction state, so that the gain of the floating diffusion FD11 is set to the first medium conversion gain MCG1 corresponding to the sum of the FD capacitance CFD and the first capacitance C1 of the first storage capacitor SC11. After this, the reading part 70 controls the transfer transistor TG11-Tr to remain in the conduction state for a predetermined second transfer period, so that the charges stored in the photodiode PD11 are transferred to the floating diffusion FD11. The reading part 70 then switches the transfer transistor TG11-Tr into the non-conduction state in order to perform a first medium conversion gain signal read-out operation MCG1-SIG in a second read-out period following the second transfer period.

Next, the second storage transistor SG12-Tr is switched into the conduction state, so that the gain of the floating diffusion FD11 is set to the fourth low conversion gain LCG4 corresponding to the sum of the FD capacitance CFD, the first capacitance C1 of the first storage capacitor SC11 and the second capacitance C2 of the second storage capacitor SC12. After this, the reading part 70 controls the transfer transistor TG11-Tr to remain in the conduction state for a predetermined third transfer period, so that the charges stored in the photodiode PD11 are transferred to the floating diffusion FD11. After this, the reading part 70 switches the transfer transistor TG11-Tr into the non-conduction state.

In the second conversion gain read-out mode CGRM2, the reading part 70 keeps an intensified voltage level of the control signal for the transfer transistor TG11-Tr to make sure that the transfer transistor TG11-Tr remains in the non-conduction state, for example, keeps the voltage level of the control signal at a negative level (negative voltage) VM, in order to control the overflow charges during read-out, at least during the fourth low conversion gain signal read-out operation LCG4-SIG and during the fourth low conversion gain reset read-out operation LCG4-RST.

The reading part 70 then performs a fourth low conversion gain signal read-out operation LCG4-SIG in a third read-out period following the third transfer period. After this, the reading part 70 switches the first reset transistor RST11-Tr into the conduction state, so that the floating diffusion FD11 is reset.

The reading part 70 then switches the reset transistor RST11-Tr into the non-conduction state in order to perform a fourth low conversion gain reset read-out operation LCG4-RST in the following read-out period.

In the fourth optional operation, the FWC of the photodiode PD11 is greater than the FWC equal to the sum of the CFD and the C1. The fourth optional operation can thus effectively contribute to increase the dynamic range.

(Operation in GS Mode)

The following now describes the three different operations performed in the global shutter mode with reference to the corresponding timing charts.

(First Operation in GS Mode)

Figure 11:
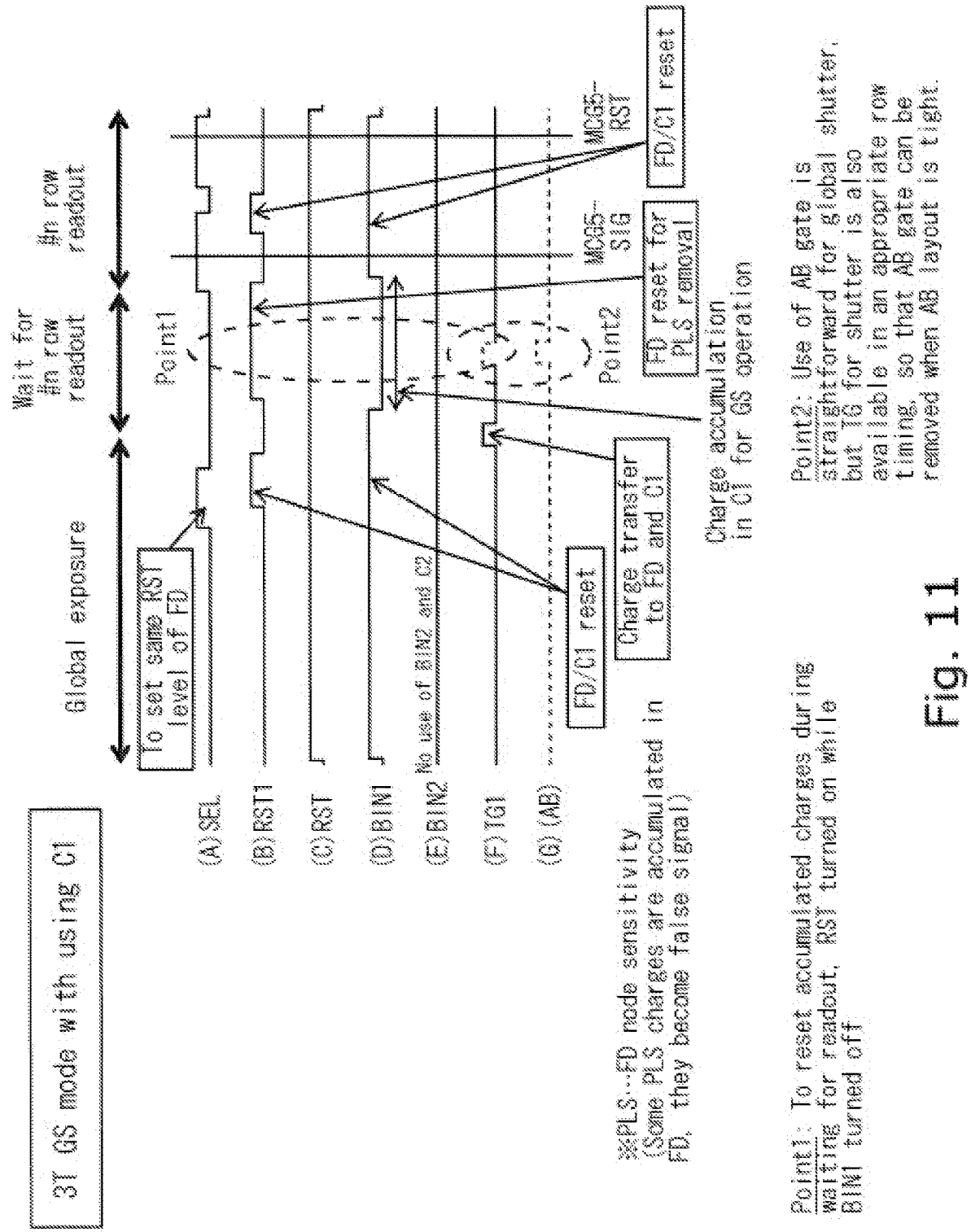
FIG. 11 is a timing chart to illustrate, as an example, a first operation performed in a global shutter mode to read the pixel in the solid-state imaging device relating to the first embodiment of the present invention.

FIG. 11 is a timing chart including waveforms (A) to (E) to illustrate an example of a first operation performed in a global shutter mode to read the pixel signal from the pixel in the solid-state imaging device relating to the first embodiment of the present invention.

In FIG. 11, the waveform (A) shows the control signal SEL for the selection transistor SEL11-Tr, the waveform (B) shows the control signal RST1 for the second reset transistor RST12-Tr, the waveform (C) shows the control signal RST for the first reset transistor RST11-Tr, the waveform (D) shows the control signal BIN1 for the first storage transistor SG11-Tr, the waveform (E) shows the control signal BIN2 for the second storage transistor SG12-Tr, the waveform (F) shows the control signal TG1 for the transfer transistor TG11-Tr, and the waveform (G) shows the control signal AB1 for the overflow gate AB11-Tr.

When performing a first operation, the reading part 70 is capable of using the first capacitance C1 from among the first and second capacitances C1 and C2 to allow the pixel 200 to operate in the global shutter (GS) mode, and of setting and switching over to a fifth medium conversion gain MCG5 corresponding to the sum of the capacitance CFD of the floating diffusion FD11 and the first capacitance C1. In the global shutter (GS) mode, the reading part 70 sequentially performs a fifth medium conversion gain signal read-out operation MCG5-SIG and a fifth medium conversion gain reset read-out operation MCG5-RST, between which the second reset transistor RST12-Tr resets the floating diffusion FD11.

When performing the first operation in the GS mode, the reading part 70 equalizes the reset levels of the floating diffusions FD11 through the second reset transistors RST12-Tr, then resets the floating diffusion FD11 and the first capacitance C1, and controls the stored charges to be transferred to the floating diffusion FD11 and the first capacitance C1 in the later half of the global shutter (GS) exposure period PEXP. Within a read-out waiting period PWRD, the reading part 70 keeps the first storage transistor SG11-Tr in the non-conduction state for a predetermined period of time, so that the floating diffusion FD11 is reset to eliminate the parasitic light sensitivity (PLS) of the floating diffusion FD11 while the first capacitance C1 is suspended (prevented) from being accessed.

The first operation can achieve both high full well capacity and global shutter (GS).

(Second Operation in GS Mode)

Figure 12:
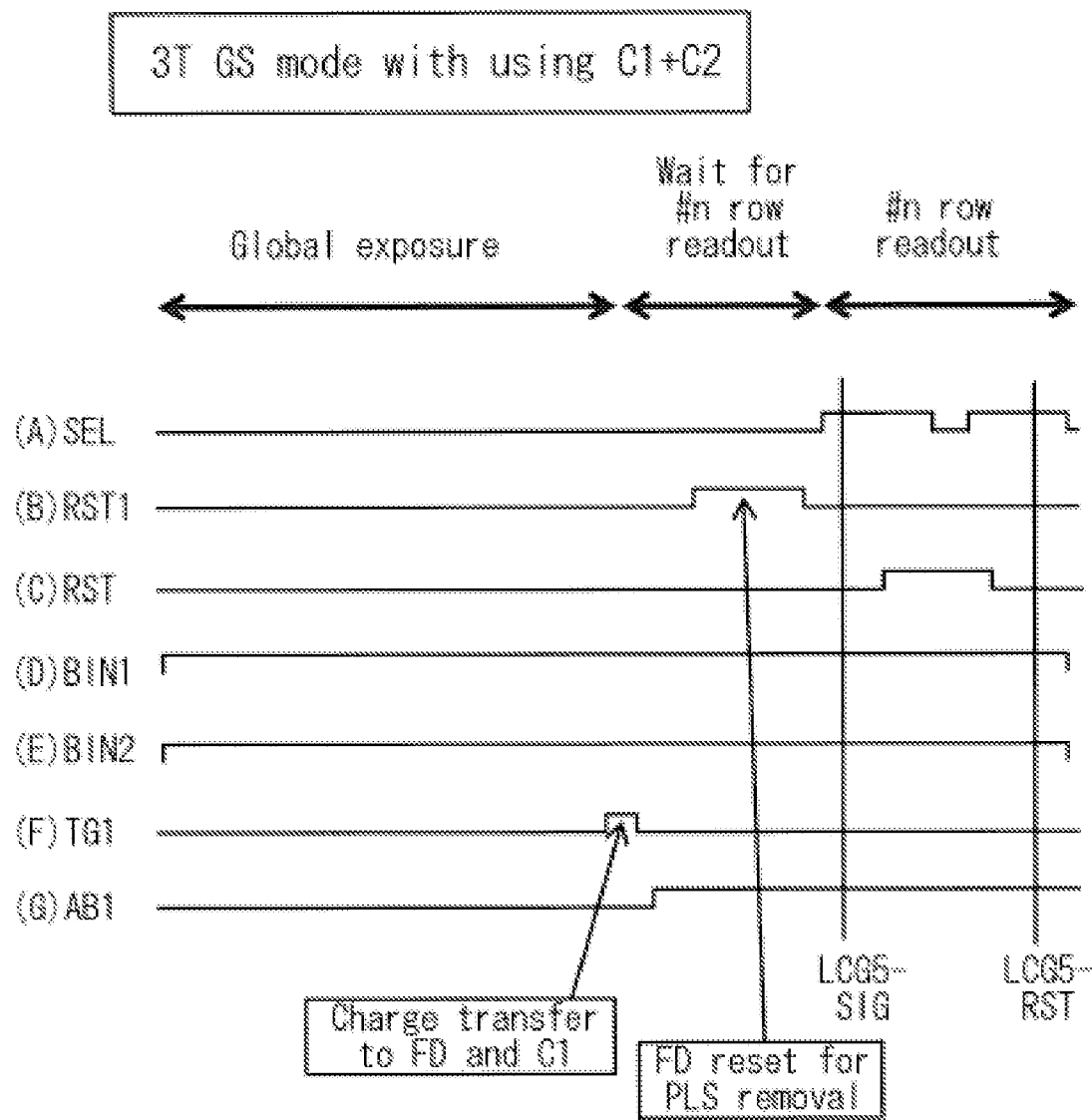
FIG. 12 is a timing chart to illustrate, as an example, a second operation performed in a global shutter mode to read the pixel in the solid-state imaging device relating to the first embodiment of the present invention.

FIG. 12 is a timing chart including waveforms (A) to (E) to illustrate a second operation performed in a global shutter mode to read the pixel in the solid-state imaging device relating to the first embodiment of the present invention.

In FIG. 12, the waveform (A) shows the control signal SEL for the selection transistor SEL11-Tr, the waveform (B) shows the control signal RST1 for the second reset transistor RST12-Tr, the waveform (C) shows the control signal RST for the first reset transistor RST11-Tr, the waveform (D) shows the control signal BIN1 for the first storage transistor SG11-Tr, the waveform (E) shows the control signal BIN2 for the second storage transistor SG12-Tr, the waveform (F) shows the control signal TG1 for the transfer transistor TG11-Tr, and the waveform (G) shows the control signal AB1 for the overflow gate AB11-Tr.

When performing the second operation, the reading part 70 is capable of using the first and second capacitances C1 and C2 to allow the pixel 200 to operate in the global shutter (GS) mode, and of setting and switching over to a fifth low conversion gain LCG5 corresponding to the capacitance CFD of the floating diffusion FD11, the first capacitance C1 and the second capacitance C2. In the global shutter (GS) mode, the reading part 70 sequentially performs a fifth low conversion gain signal read-out operation LCG5-SIG and a fifth low conversion gain reset read-out operation LCG5-RST.

When performing the second operation in the GS mode, the reading part 70 can control the stored charges to be transferred to the floating diffusion FD11, the first capacitance C1 and the second capacitance C2 in the later half of the global shutter (GS) exposure period PEXP. The reading part 70 resets the floating diffusion FD11 to eliminate the parasitic light sensitivity (PLS) within a read-out waiting period PWRD.

(Third Operation in GS Mode)

Figure 13:
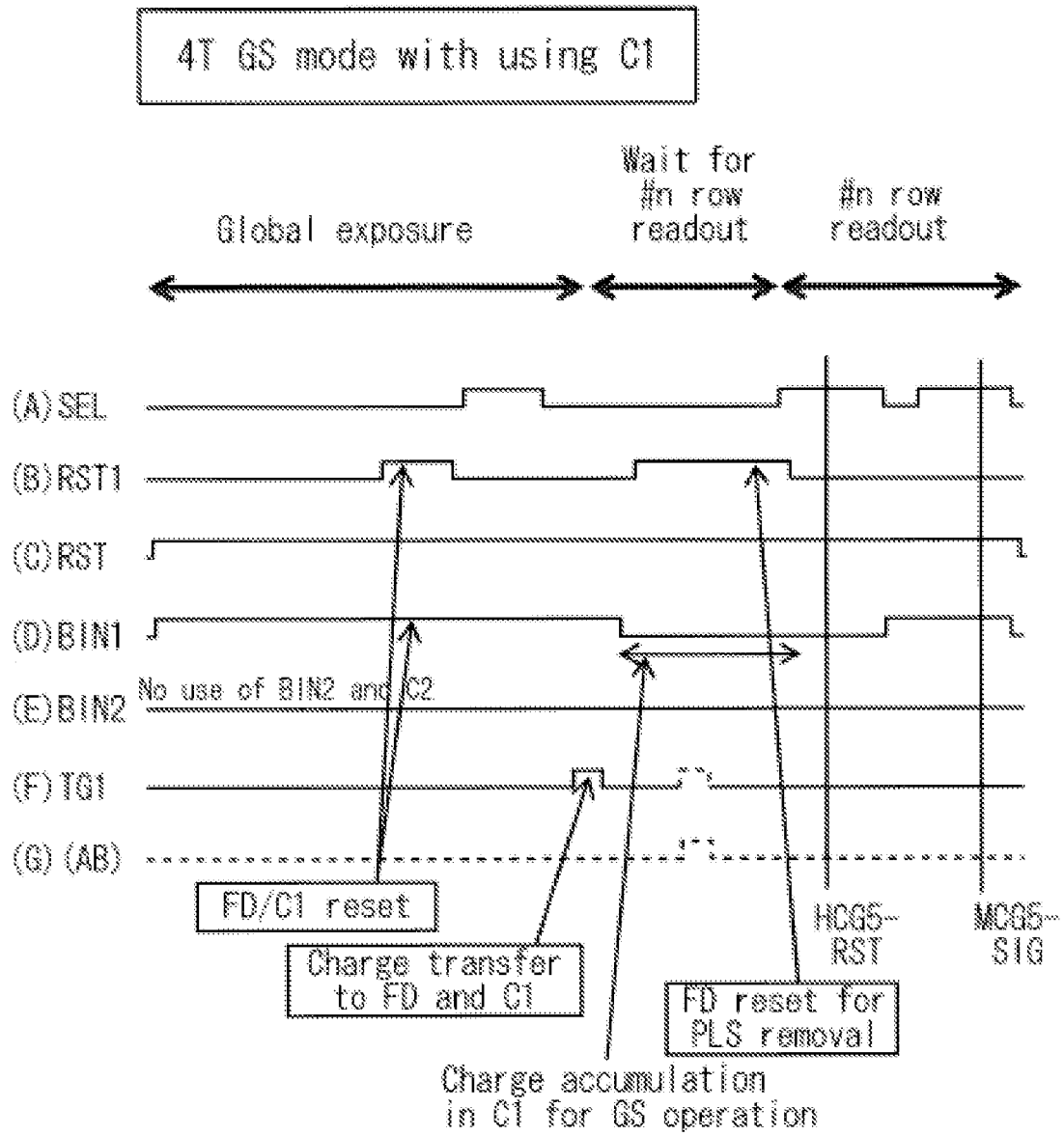
FIG. 13 is a timing chart to illustrate, as an example, a third operation performed in a global shutter mode to read the pixel in the solid-state imaging device relating to the first embodiment of the present invention.

FIG. 13 is a timing chart including waveforms (A) to (G) to illustrate a third operation performed in a global shutter mode to read the pixel signal from the pixel in the solid-state imaging device relating to the first embodiment of the present invention.

In FIG. 13, the waveform (A) shows the control signal SEL for the selection transistor SEL11-Tr, the waveform (B) shows the control signal RST1 for the second reset transistor RST12-Tr, the waveform (C) shows the control signal RST for the first reset transistor RST11-Tr, the waveform (D) shows the control signal BIN1 for the first storage transistor SG11-Tr, the waveform (E) shows the control signal BIN2 for the second storage transistor SG12-Tr, the waveform (F) shows the control signal TG1 for the transfer transistor TG11-Tr, and the waveform (G) shows the control signal AB1 for the overflow gate AB11-Tr.

When performing the third operation, the reading part 70 is capable of using the first capacitance C1 from among the first and second capacitances C1 and C2 to allow the pixel 200 to operate in the global shutter (GS) mode, and of setting and switching over to a fifth high conversion gain HCG5 corresponding to the sum of the capacitance CFD of the floating diffusion FD11 and the first capacitance C1. In the global shutter (GS) mode, the reading part 70 sequentially performs a fifth high conversion gain signal read-out operation HCG5-SIG and a fifth high conversion gain reset read-out operation HCG5-RST.

When performing the third operation in the GS mode, the reading part 70 equalizes the reset levels of the floating diffusions FD11 through the second reset transistors RST12-Tr, then resets the floating diffusion FD11 and the first capacitance C1, and controls the stored charges to be transferred to the floating diffusion FD11 and the first capacitance C1 in the later half of the global shutter (GS) exposure period PEXP. Within a read-out waiting period PWRD, the reading part 70 keeps the first storage transistor SG11-Tr in the non-conduction state for a predetermined period of time, so that the floating diffusion FD11 is reset to eliminate the parasitic light sensitivity (PLS) of the floating diffusion FD11 while the first capacitance C1 is suspended (prevented) from being accessed.

In the first, second and third operations, the PLS of the floating diffusion in a given pixel may be eliminated before pixel signals are read from a row of pixels including the given pixel and while the charges are held. Accordingly, shading can be reduced.

As described above, in the solid-state imaging device 10 relating to the first embodiment, the pixel part 20 includes the pixels 200 arranged in a matrix pattern, and each pixel 200 includes the photoelectric conversion reading part 210 and the signal holding part 220. The solid-state imaging device 10 is capable of performing the rolling shutter (RS) and global shutter (GS) and configured to select an appropriate pixel operation mode between the rolling shutter (RS) and global shutter (GS) modes. In addition, the solid-state imaging device 10 is configured to switch the conversion gain read-out mode where the signals produced with different conversion gains are read among several options depending on the scene. As shown in FIG. 2, the photoelectric conversion reading part 210 includes: the photodiode PD11 serving as the photoelectric conversion element for generating electric charges through photoelectric conversion and storing the generated charges in an integration period; the transfer transistor TG11-Tr serving as the transfer element for transferring the charges stored in the photodiode PD11 in a transfer period following the integration period; and the floating diffusion FD11 for receiving the charges stored in the photodiode PD11 that are transferred through the transfer transistor TG11. The photoelectric conversion reading part 210 further includes the conversion signal reading part 211 capable of operating in the first conversion gain read-out mode CGRM1 and the second conversion gain read-out mode CGRM2. In the first conversion gain read-out mode CGRM1, the conversion signal reading part 211 is configured to read a signal corresponding to at least one conversion gain associated with the first capacitance C1 and the capacitance CFD of the floating diffusion FD11. In the second conversion gain read-out mode CGRM2, the conversion signal reading part 211 is configured to read a signal corresponding to at least one conversion gain associated with the capacitance CFD of the floating diffusion FD11, the first capacitance C1 and the second capacitance C2, which is sufficiently greater than the capacitances CFD and C1. The conversion signal reading part 211 is configured to amplify a voltage signal resulting from conversion with a conversion gain and outputs the amplified signal.

In the first embodiment, the reading part 70 can switch between the first conversion gain read-out mode CGRM1 and the second conversion gain read-out mode CGRM2 depending on a scene (for example, the level (intensity) of illuminance). In the first embodiment, the first conversion gain read-out mode (for example, dual conversion gain read-out mode) CGRM1 is selected for low to middle illuminance, and the second conversion gain read-out mode CGRM2 is selected for high illuminance. This can result in minimizing a drop in SNR at the conjunction point between a high conversion gain (HCG) signal and a low conversion gain (LCG) signal and achieving high full well capacity and little dark noise.

In the first embodiment, the reading part 70 can switch between the first conversion gain read-out mode CGRM1 and the second conversion gain read-out mode CGRM2 when the solid-state imaging device 10 is operating in the rolling shutter (RS) mode. The reading part 70 can select the first conversion gain read-out mode CGRM1 when the solid-state imaging device 10 is operating in the rolling shutter (RS) mode if the illuminance of the scene is at least one of low illuminance or middle illuminance, and select the second conversion gain read-out mode CGRM2 when the solid-state imaging device 10 is operating in the rolling shutter (RS) mode if the illuminance of the scene is high illuminance.

Accordingly, the first embodiment can reduce the degradation of the SNR at the conjunction point between signals produced with different conversion gains. The first embodiment can also provide for enhanced dynamic range by performing reading in a predetermined mode while the pixel achieves a small size. The first embodiment is capable of substantially achieving increased dynamic range.

In other words, in the first embodiment, the pixel operating mode can be selected between the rolling shutter (RS) mode and the global shutter (GS) mode. In addition, the conversion gain read-out mode where signals produced with different conversion gains are read can be switched among several options depending on the scene. As a result, the present invention can minimize the drop in SNR at the conjunction point between the high conversion gain (HCG) signal and low conversion gain (LCG) signal and achieve high full well capacity and low dark noise.

Second Embodiment

Figure 14:
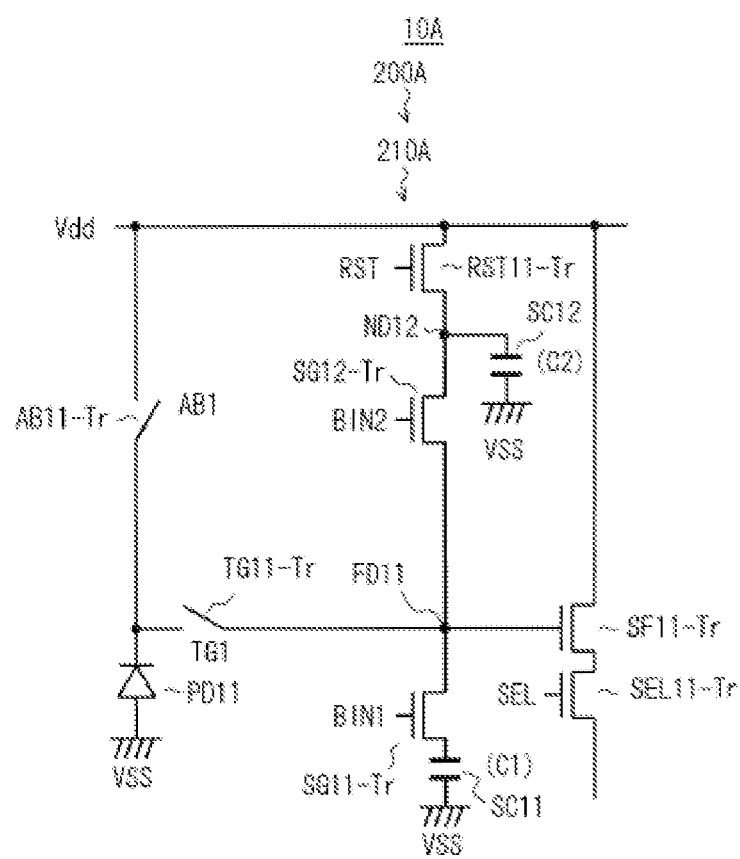
FIG. 14 is a circuit diagram showing an example configuration of a photoelectric conversion reading part of a pixel of a solid-state imaging device relating to a second embodiment of the present invention.

FIG. 14 is a circuit diagram showing an example configuration of a photoelectric conversion reading part of a pixel of a solid-state imaging device relating to a second embodiment of the present invention.

The photoelectric conversion reading part 210A of the pixel 200A of the solid-state imaging device 10A relating to the second embodiment differs from the photoelectric conversion reading part 210 of the pixel 200 of the solid-state imaging device 10 relating to the above-described first embodiment in the following points.

The photoelectric conversion reading part 210 relating to the first embodiment includes, as the basic constituent elements: the first storage capacitor SG11-Tr serving as the first capacitance element the capacitance of which serves as the first capacitance C1; the second storage capacitor SC12-Tr serving as the second capacitance element the capacitance of which serves as the second capacitance C2; the first storage transistor SG11-Tr serving as the first storage connection element for selectively connecting the floating diffusion FD11 to the first storage capacitor SC11; and the second storage transistor SG12-Tr serving as the second storage connection element for selectively connecting the floating diffusion FD11 and the second storage capacitor SC12. In the photoelectric conversion reading part 210, the connection node ND11 between the first storage transistor SG11-Tr and the first storage capacitor SC11 is connected to the second storage transistor SG12-Tr, and the connection node ND12 between the second storage transistor SG12-Tr and the second storage capacitor SC12 is connected to the first reset transistor RST11-Tr.

In the photoelectric conversion reading part 210A relating to the second embodiment, the first storage transistor SG11-Tr, which is one of the basic constituent elements, is connected between the floating diffusion FD11 and the first storage capacitor SC11, and the second storage transistor SG12-Tr is connected between the floating diffusion FD11 and the second storage capacitor SC12 (the connection node ND12). In the second embodiment, the second reset transistor RST12-Tr is also used by the overflow gate transistor AB11-Tr.

The second embodiment can produce the same effects as the above-described first embodiment.

Third Embodiment

Figure 15:
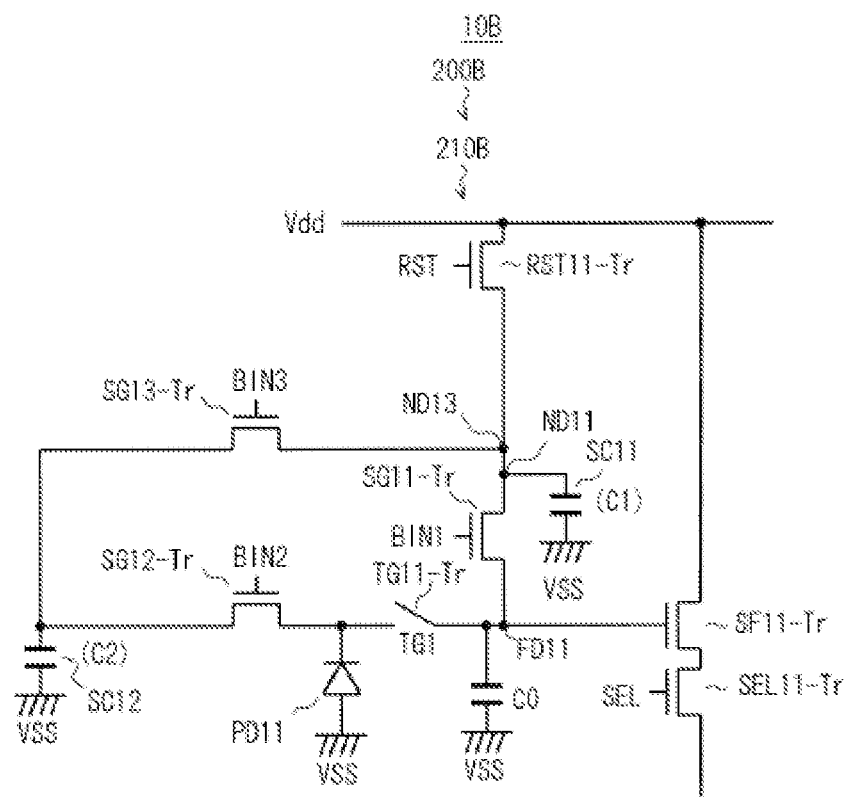
FIG. 15 is a circuit diagram showing an example configuration of a photoelectric conversion reading part of a pixel of a solid-state imaging device relating to a third embodiment of the present invention.

FIG. 15 is a circuit diagram showing an example configuration of a photoelectric conversion reading part of a pixel of a solid-state imaging device relating to a third embodiment of the present invention.

The photoelectric conversion reading part 210B of the pixel 200B of the solid-state imaging device 10B relating to the third embodiment differs from the photoelectric conversion reading part 210 of the pixel 200 of the solid-state imaging device 10 relating to the above-described first embodiment in the following points.

The photoelectric conversion reading part 210 relating to the first embodiment includes, as the basic constituent elements: the first storage capacitor SG11-Tr serving as the first capacitance element the capacitance of which serves as the first capacitance C1; the second storage capacitor SC12-Tr serving as the second capacitance element the capacitance of which serves as the second capacitance C2; the first storage transistor SG11-Tr serving as the first storage connection element for selectively connecting the floating diffusion FD11 to the first storage capacitor SC11; and the second storage transistor SG12-Tr serving as the second storage connection element for selectively connecting the floating diffusion FD11 and the second storage capacitor SC12. In the photoelectric conversion reading part 210, the connection node ND11 between the first storage transistor SG11-Tr and the first storage capacitor SC11 is connected to the second storage transistor SG12-Tr, and the connection node ND12 between the second storage transistor SG12-Tr and the second storage capacitor SC12 is connected to the first reset transistor RST11-Tr.

The photoelectric conversion reading part 210B relating to the third embodiment further includes a third storage transistor SG13-Tr serving as a third storage connection element for selectively connecting (i) the connection node ND11 between the first storage transistor SG11-Tr and the first storage capacitor SC11 to the second storage capacitor SC12-Tr. In the photoelectric conversion reading part 210B, the second storage transistor SG12-Tr is connected between the photodiode PD11 and the second storage capacitor SC12, and the connection node ND13 between the first storage transistor SG11-Tr and the first storage capacitor SC11 and the third storage transistor SG13-Tr is connected to the reset transistor RST11-Tr.

The third embodiment can produce the same effects as the above-described first embodiment.

Fourth Embodiment

Figure 16:
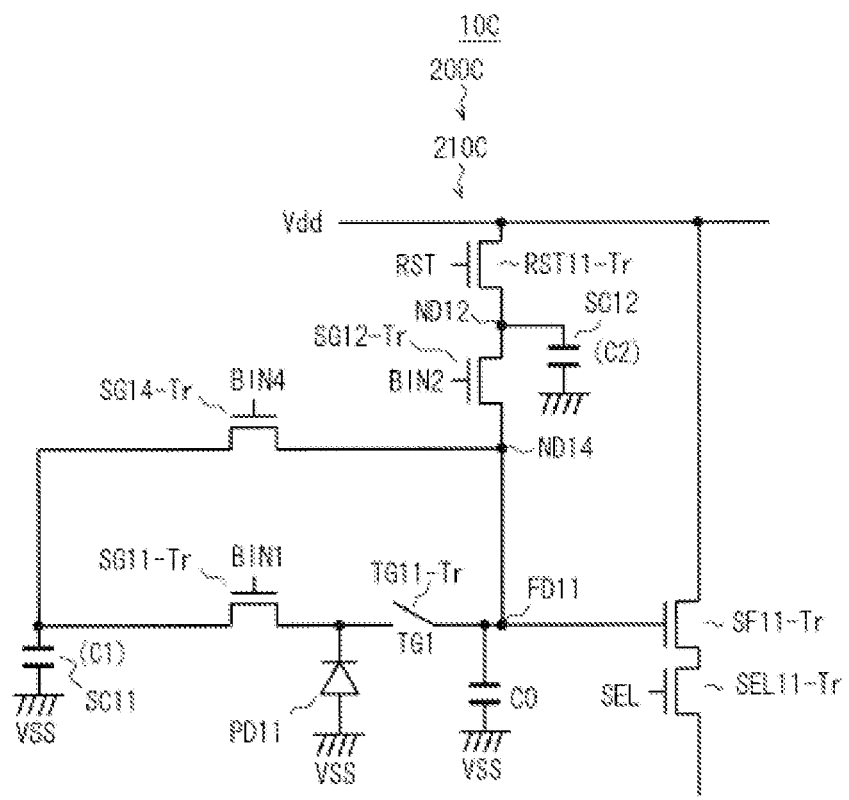
FIG. 16 is a circuit diagram showing an example configuration of a photoelectric conversion reading part of a pixel of a solid-state imaging device relating to a fourth embodiment of the present invention.

FIG. 16 is a circuit diagram showing an example configuration of a photoelectric conversion reading part of a pixel of a solid-state imaging device relating to a fourth embodiment of the present invention.

The photoelectric conversion reading part 210C of the pixel 200C of the solid-state imaging device 10C relating to the fourth embodiment differs from the photoelectric conversion reading part 210 of the pixel 200 of the solid-state imaging device 10 relating to the above-described first embodiment in the following points.

The photoelectric conversion reading part 210 relating to the first embodiment includes, as the basic constituent elements: the first storage capacitor SG11-Tr serving as the first capacitance element the capacitance of which serves as the first capacitance C1; the second storage capacitor SC12-Tr serving as the second capacitance element the capacitance of which serves as the second capacitance C2; the first storage transistor SG11-Tr serving as the first storage connection element for selectively connecting the floating diffusion FD11 to the first storage capacitor SC11; and a second storage transistor SG12-Tr serving as a second storage connection element for selectively connecting the floating diffusion FD11 and the second storage capacitor SC12. In the photoelectric conversion reading part 210, the connection node ND11 between the first storage transistor SG11-Tr and the first storage capacitor SC11 is connected to the second storage transistor SG12-Tr, and the connection node ND12 between the second storage transistor SG12-Tr and the second storage capacitor SC12 is connected to the first reset transistor RST11-Tr.

The photoelectric conversion reading part 210C relating to the fourth embodiment further includes a third storage transistor SG14-Tr serving as a third storage connection element for selecting connecting the second storage transistor SG12-Tr and the first storage capacitor SC11. In the photoelectric conversion reading part 210C, the first storage transistor SG11-Tr is connected between the photodiode PD11 and the first storage capacitor SC11, and the connection node ND14 between the second storage transistor SG12-Tr and the third storage transistor SC14-Tr is connected to the floating diffusion FD11, and the connection node ND12 between the second storage transistor SG12-Tr and the second storage capacitor SC12 is connected to the reset transistor RST11-Tr.

The fourth embodiment can produce the same effects as the above-described first embodiment.

Fifth Embodiment

Figure 17:
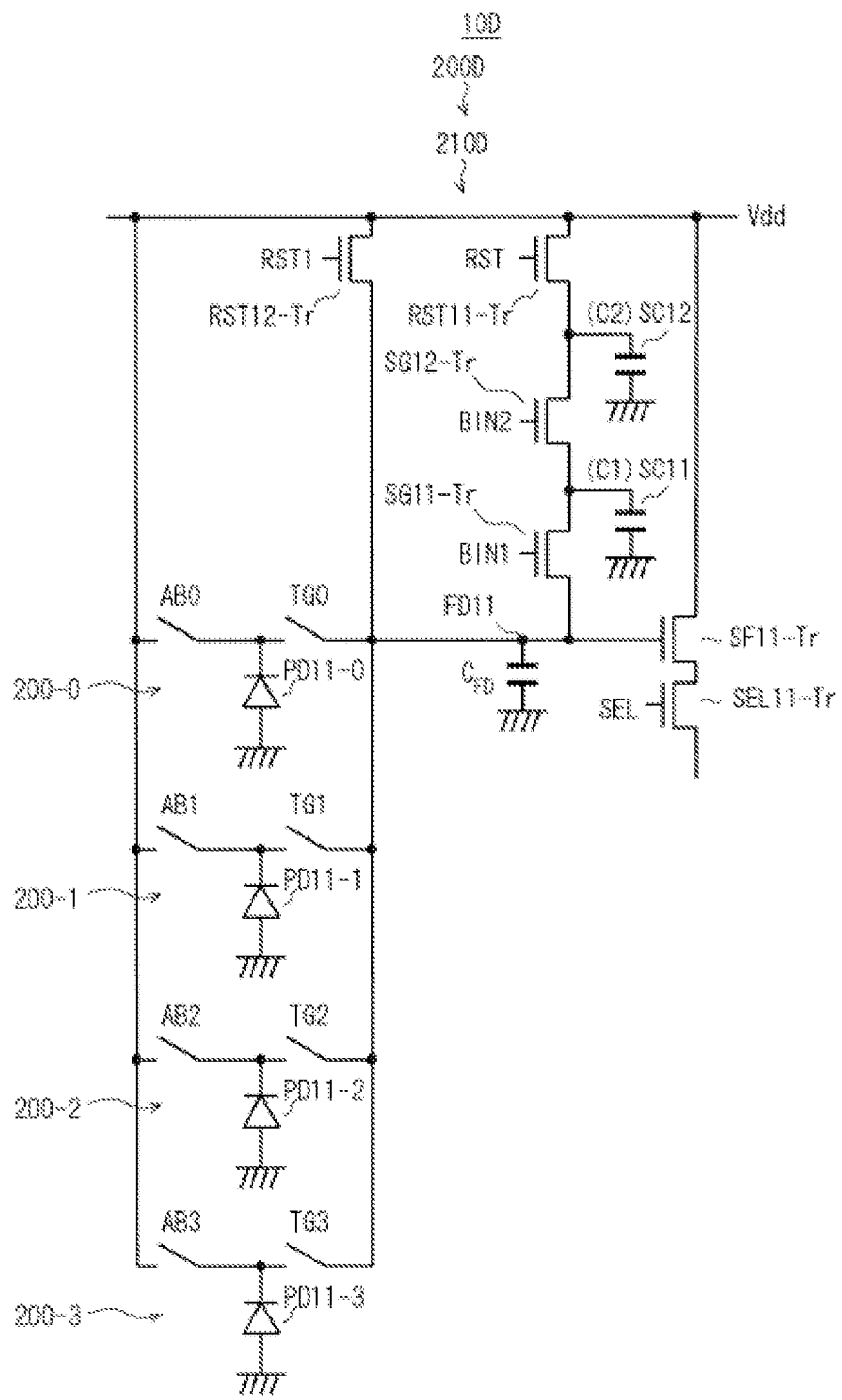
FIG. 17 is a circuit diagram showing an example configuration of a photoelectric conversion reading part having a pixel sharing configuration in a solid-state imaging device relating to a fifth embodiment of the present invention.

FIG. 17 is a circuit diagram showing an example configuration of a photoelectric conversion reading part of a solid-state imaging device having pixel sharing configuration relating to a fifth embodiment of the present invention.

The photoelectric conversion reading part 210D of the pixel 200D of the solid-state imaging device 10D relating to the fifth embodiment differs from the photoelectric conversion reading part 210 of the pixel 200 of the solid-state imaging device 10 relating to the above-described first embodiment in the following points.

The solid-state imaging device 10D relating to the fifth embodiment has a pixel sharing configuration, where a plurality of (in the present embodiment, four) adjacent pixels 200-0, 200-1, 200-2 and 200-3 share one floating diffusion FD11. In the solid-state imaging device 10D relating to the fifth embodiment, the adjacent pixels 200-0, 200-1, 200-2 and 200-3 share the first storage transistor SG11-Tr serving as the first connection element and the first storage capacitor SC11 serving as the first capacitance element. In the solid-state imaging device 10D relating to the fifth embodiment, the adjacent pixels 200-0, 200-1, 200-2 and 200-3 share the second storage transistor SG12-Tr serving as the second connection element and the second storage capacitor SC12 serving as the second capacitance element. In the solid-state imaging device 10D relating to the fifth embodiment, the adjacent pixels 200-0, 200-1, 200-2 and 200-3 share the first reset transistor RST11-Tr serving as the first reset element and the second reset transistor RST12-Tr serving as the second reset element. According to the pixel sharing configuration of the present example, the adjacent pixels also share the source follower transistor SF11-Tr and the selection transistor SEL11-Tr.

Figure 18:
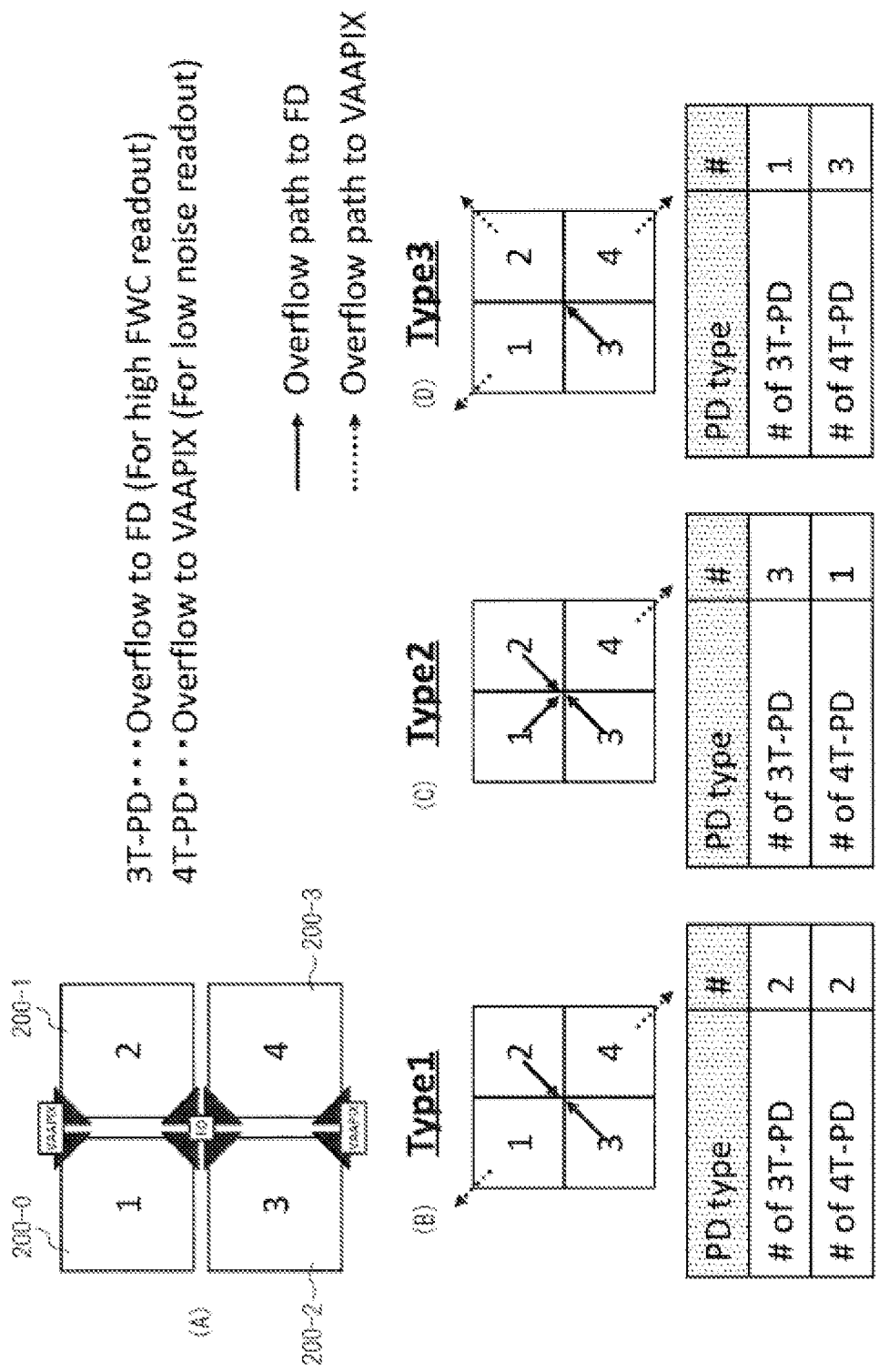
FIG. 18 is used to illustrate how the pixel having the pixel sharing configuration is used in the fifth embodiment of the present invention.

FIG. 18 includes views (A) to (D) used to illustrate how the pixels are used when the pixel sharing configuration is employed in the fifth embodiment of the present invention. In FIG. 18, the term "3T-PD" represents the read-out mode where the charges are guided to overflow into the floating diffusion FD for realizing high FWC, and the term "4T-PD" represents the read-out mode where the charges are guided to overflow into the power supply potential Vdd (or VAAPIX) for accomplishing low noise.

Figure 19:
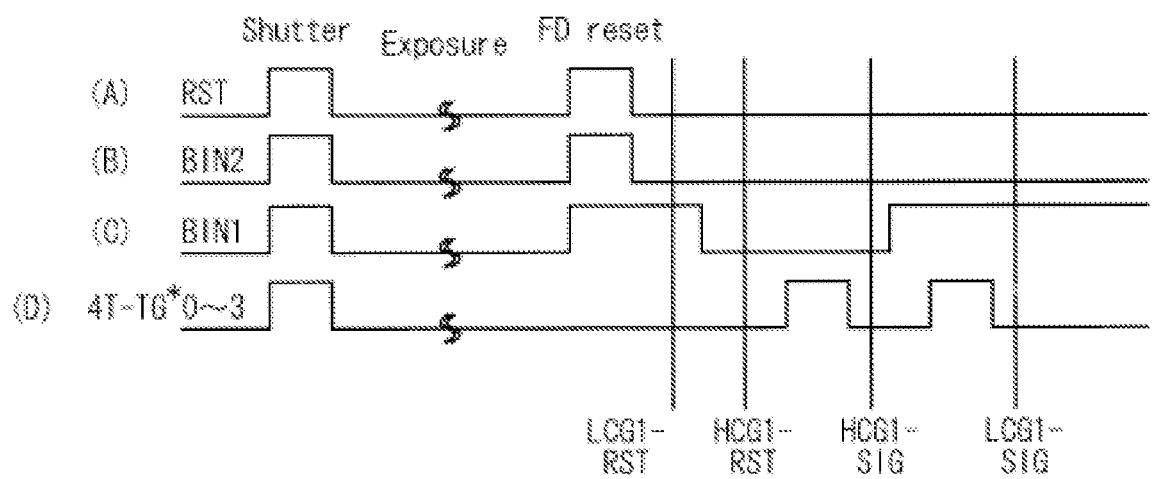
FIG. 19 is a timing chart to illustrate, as an example, a sequence of operations performed in a first conversion gain read-out mode (dual conversion gain read-out mode) in a rolling shutter mode to read the pixels in the solid-state imaging device relating to the fifth embodiment of the present invention.
Figure 20:
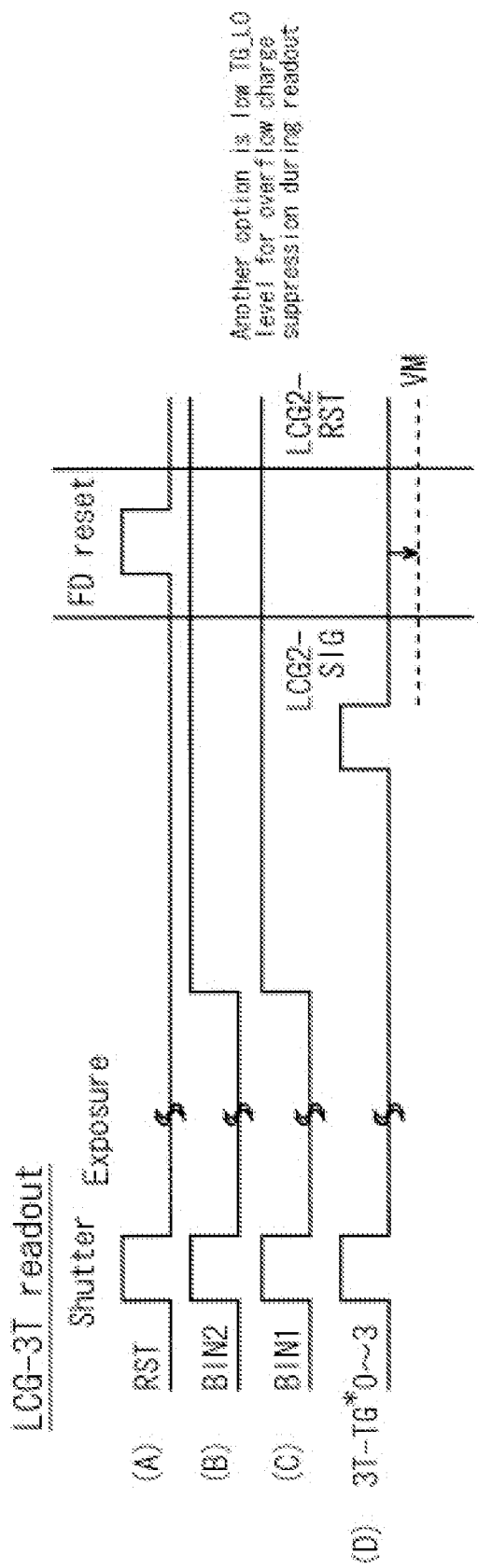
FIG. 20 is a timing chart to illustrate, as an example, a sequence of operations performed in a second conversion gain read-out mode (low conversion gain read-out mode) in a rolling shutter mode to read the pixels in the solid-state imaging device relating to the fifth embodiment of the present invention.

FIG. 19 is a timing chart including waveforms (A) to (D) to illustrate, as an example, a sequence of operations performed in the first conversion gain read-out mode (dual conversion gain read-out mode) in the rolling shutter mode to read the pixel signals from the pixels in the solid-state imaging device relating to the fifth embodiment of the present invention. FIG. 20 is a timing chart including waveforms (A) to (D) to illustrate, as an example, a sequence of operations performed in the second conversion gain read-out mode (low conversion gain read-out mode) in the rolling shutter mode to read the pixel signals from the pixels in the solid-state imaging device relating to the fifth embodiment of the present invention.

In the fifth embodiment, the sharing pixels 200-0 to 200-3 each include an overflow gate AB11-Tr connected to the photodiode PD11. The overflow gate AB11-Tr is configured to allow the photodiode PD11 to discharge charges toward the region other than the region where the floating diffusion FD11 is formed. The reading part 70 can control the reading of the pixel signals from the sharing pixels such that one or more of the sharing pixels employ the read-out mode "3T-PD" where the charges are guided to overflow into the floating diffusion FD11 and remaining one or more of the sharing pixels employ the read-out mode "4T-PD" where the charges are guided to overflow toward the region other than the region where the floating diffusion FD11 is formed, for example, toward the power supply potential VAA-PIX. According to the view (B) in FIG. 18, two of the four sharing pixels employ the "3T-PD," and the remaining two employ the "4T-PD." According to the view (C) in FIG. 18, three of the four sharing pixels employ the "3T-PD," and the remaining one employs the "4T-PD." According to the view (D) in FIG. 18, one of the four sharing pixels employs the "3T-PD," and the remaining three employ the "4T-PD."

In other respects, the fifth embodiment is the same as the first embodiment described above. The fifth embodiment can not only produce the same effects as the above-described first embodiment but also achieve a reduced pixel size and simplified circuit configuration.

Sixth Embodiment

Figure 21:
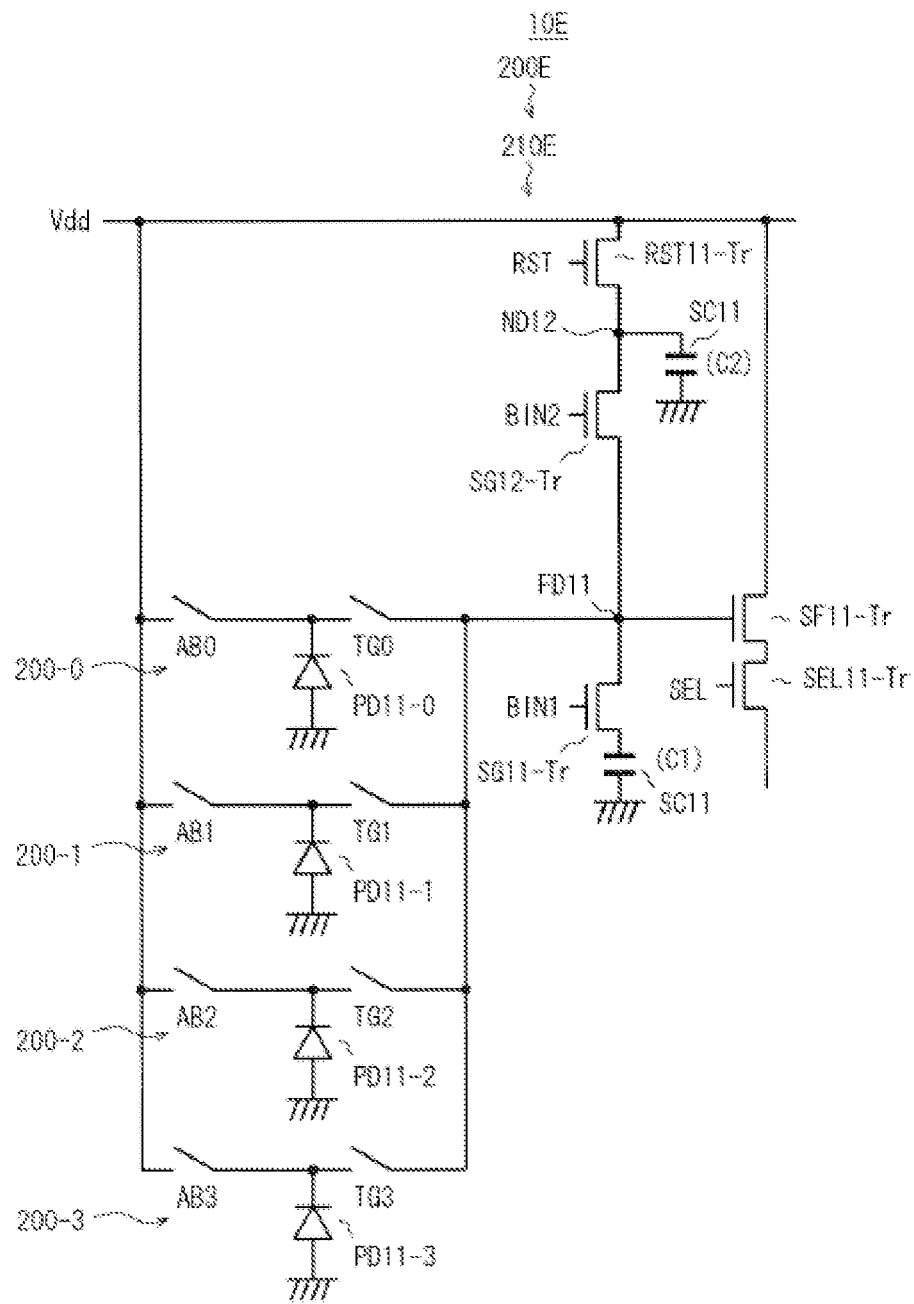
FIG. 21 is a circuit diagram showing an example configuration of a photoelectric conversion reading part of a solid-state imaging device having a pixel sharing configuration in a sixth embodiment of the present invention.

FIG. 21 is a circuit diagram showing an example configuration of a photoelectric conversion reading part of a pixel of a solid-state imaging device having pixel sharing configuration relating to a sixth embodiment of the present invention.

The photoelectric conversion reading part 210E of the pixel 200E of the solid-state imaging device 10E relating to the sixth embodiment differs from the photoelectric conversion reading part 210 of the pixel 200 of the solid-state imaging device 10 relating to the above-described first embodiment in the following points.

The solid-state imaging device 10E relating to the sixth embodiment has pixel sharing configuration, where a plurality of (in the present embodiment, four) adjacent pixels 200-0, 200-1, 200-2 and 200-3 share one floating diffusion FD11. In the solid-state imaging device 10E relating to the sixth embodiment, the adjacent pixels 200-0, 200-1, 200-2 and 200-3 share a first storage transistor SG11-Tr serving as a first connection element and a first storage capacitor SC11 serving as a first capacitance element. In the solid-state imaging device 10E relating to the sixth embodiment, the adjacent pixels 200-0, 200-1, 200-2 and 200-3 share the second storage transistor SG12-Tr serving as the second connection element and the second storage capacitor SC12 serving as the second capacitance element. In the solid-state imaging device 10E relating to the sixth embodiment, the adjacent pixels 200-0, 200-1, 200-2 and 200-3 share the first reset transistor RST11-Tr serving as the first reset element. According to the pixel sharing configuration of the present example, the adjacent pixels also share the source follower transistor SF11-Tr and the selection transistor SEL11-Tr.

In other respects, the sixth embodiment is the same as the first embodiment described above. The sixth embodiment can not only produce the same effects as the above-described first embodiment but also achieve a reduced pixel size and simplified circuit configuration.

<Examples of Application to Electronic Apparatuses>

The solid-state imaging devices 10, 10A to 10E described above can be applied, as an imaging device, to electronic apparatuses such as digital cameras, video cameras, mobile terminals, surveillance cameras, and medical endoscope cameras.

Figure 22:
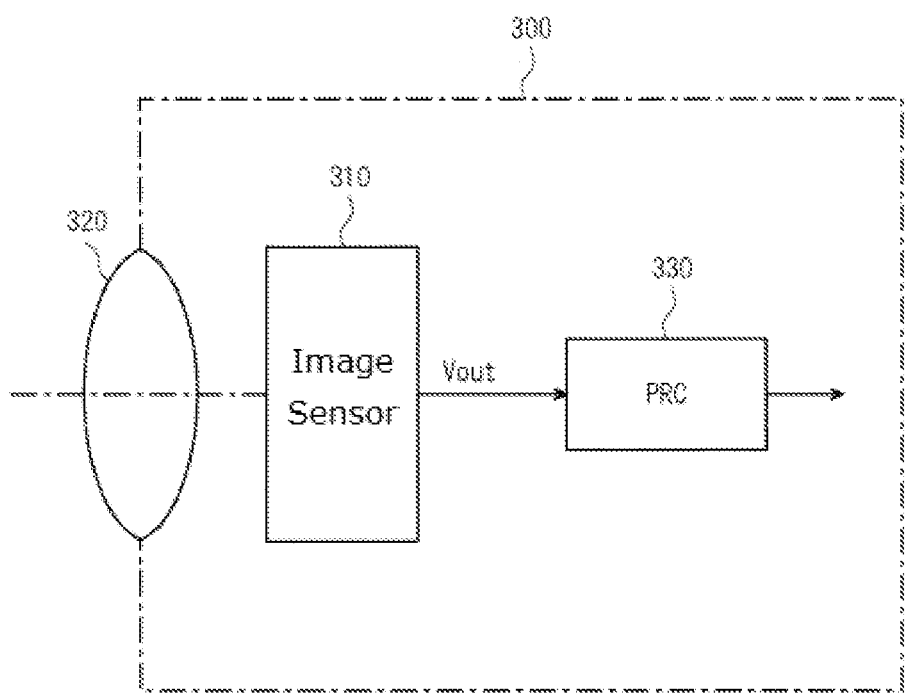
FIG. 22 shows an example configuration of an electronic apparatus to which the solid-state imaging devices relating to the embodiments of the present invention can be applied.

FIG. 22 shows an example configuration of an electronic apparatus including a camera system to which the solid-state imaging devices according to the embodiments of the present invention can be applied.

As shown in FIG. 22, the electronic apparatus 300 includes a CMOS image sensor 310 that can be constituted by any of the solid-state imaging devices 10, 10A to 10E relating to the embodiments of the present invention. The electronic apparatus 300 further includes an optical system (such as a lens) 320 for redirecting the incident light to the pixel region of the CMOS image sensor 310 (to form a subject image). The electronic apparatus 300 includes a signal processing circuit (PRC) 330 for processing the output signals from the CMOS image sensor 310.

The signal processing circuit 330 performs predetermined signal processing on the output signals from the CMOS image sensor 310. The image signals resulting from the processing in the signal processing circuit 330 can be handled in various manners. For example, the image signals can be displayed as a video image on a monitor having a liquid crystal display, printed by a printer, or recorded directly on a storage medium such as a memory card.

As described above, a high-performance, compact, and low-cost camera system can be provided that includes any one of the solid-state imaging devices 10, 10A to 10E as the CMOS image sensor 310. Accordingly, the embodiments of the present invention can provide for electronic apparatuses such as surveillance cameras and medical endoscope cameras, which are used for applications where the cameras are installed under restricted conditions from various perspectives such as the installation size, the number of connectable cables, the length of cables and the installation height.

What is claimed is:

1. A solid-state imaging device comprising:
    a pixel part having pixels arranged therein, each pixel including a photoelectric conversion reading part, each pixel being configured to operate in a rolling shutter mode and a global shutter mode; and
    a reading part for reading pixel signals from the pixel part, wherein the photoelectric conversion reading part includes:
        a photoelectric conversion element for storing therein, in an integration period, charges generated by photoelectric conversion;
        a transfer element for transferring, in a transfer period following the integration period, the charges stored in the photoelectric conversion element;
        a floating diffusion to which the charges stored in the photoelectric conversion element are transferred through the transfer element; and
        a conversion signal reading part for amplifying a voltage signal produced through conversion with a conversion gain and outputting the amplified voltage signal, the conversion signal reading part being configured to operate in a first conversion gain read-out mode and a second conversion gain read-out mode, the conversion signal reading part being configured to, while operating in the first conversion gain read-out mode, produce a readable signal with at least one conversion gain associated with a capacitance of the floating diffusion and a first capacitance, and the conversion signal reading part being configured to, while operating in the second conversion gain read-out mode, produce a readable signal with at least one conversion gain associated with the capacitance of the floating diffusion, the first capacitance, and a second capacitance,
    wherein the reading part is configured to switch whether the conversion signal reading part operates in the first conversion gain read-out mode and the second conversion gain read-out mode depending on a scene, and
    wherein the photoelectric conversion reading part includes:
        a first capacitance element, a capacitance of which serves as the first capacitance;
        a second capacitance element, a capacitance of which serves as the second capacitance;
        a first storage connection element for selectively connecting the floating diffusion and the first capacitance element; and
        a second storage connection element for selectively connecting the floating diffusion and the second capacitance element.

2. The solid-state imaging device of claim 1, wherein the each pixel is configured to produce:
    in the first conversion gain read-out mode, a readable pixel signal with at least two conversion gains, the pixel signal including a read-out reset signal corresponding to a reset state and a read-out signal corresponding to the charges stored in the photoelectric conversion element; and
    in the second conversion gain read-out mode, a readable pixel signal with at least one conversion gain, the pixel signal including a read-out reset signal corresponding to a reset state and a read-out signal corresponding to the charges stored in the photoelectric conversion element or overflow charges.

3. The solid-state imaging device of claim 2, wherein while the solid-state imaging device is operating in the rolling shutter mode, the reading part is configured to switch between the first conversion gain read-out mode and the second conversion gain read-out mode.

4. The solid-state imaging device of claim 3, wherein the reading part:
    switches over to the first conversion gain read-out mode while the solid-state imaging device is operating in the rolling shutter mode in at least one of low- and middle-illuminance scenes; and
    switches over to the second conversion gain read-out mode while the solid-state imaging device is operating in the rolling shutter mode in a high-illuminance scene.

5. The solid-state imaging device of claim 4, wherein the reading part:
    is configured to, while the solid-state imaging device is operating in the rolling shutter mode and in the first conversion gain read-out mode, set and switch between (i) a high conversion gain corresponding to the capacitance of the floating diffusion and (ii) a first low conversion gain corresponding to a sum of the capacitance of the floating diffusion and the first capacitance;
    is configured to, while the solid-state imaging device is operating in the rolling shutter mode and in the second conversion gain read-out mode, set and switch over to a second low conversion gain corresponding to a sum of the capacitance of the floating diffusion, the first capacitance and the second capacitance;
    in the first conversion gain read-out mode, sequentially performs a first low conversion gain reset read-out operation, a high conversion gain reset read-out operation, a high conversion gain signal read-out operation and a first low conversion gain signal read-out operation; and
    in the second conversion gain read-out mode, sequentially performs a second low conversion gain signal read-out operation and a second low conversion gain reset read-out operation.

6. The solid-state imaging device of claim 5, wherein, in the second conversion gain read-out mode, the reading part keeps an intensified voltage level of a control signal for the transfer element to make sure that the transfer element remains in a non-conduction state, in order to control the overflow charges during read-out, at least during the second low conversion gain signal read-out operation and during the second low conversion gain reset read-out operation.

7. The solid-state imaging device of claim 4, wherein the reading part:
    is configured to, while the solid-state imaging device is operating in the rolling shutter mode and in the first conversion gain read-out mode, set and switch between (i) a first high conversion gain corresponding to the capacitance of the floating diffusion, (ii) a third low conversion gain corresponding to a sum of the capacitance of the floating diffusion, the first capacitance and the second capacitance, and (iii) a first medium conversion gain corresponding to a sum of the capacitance of the floating diffusion and the first capacitance; and
    in the first conversion gain read-out mode, sequentially performs a third low conversion gain reset read-out operation, a first medium conversion gain reset read-out operation, a first high conversion gain reset read-out operation, a first high conversion gain signal read-out operation, a first medium conversion gain signal read-out operation, and a third low conversion gain signal read-out operation.

8. The solid-state imaging device of claim 4, wherein the reading part:
is configured to, while the solid-state imaging device is operating in the rolling shutter mode and in the second conversion gain read-out mode, set and switch between (i) a second high conversion gain corresponding to the capacitance of the floating diffusion and (ii) a fourth low conversion gain corresponding to a sum of the capacitance of the floating diffusion, the first capacitance and the second capacitance; and
in the second conversion gain read-out mode, performs a second high conversion gain reset read-out operation and a second high conversion gain signal read-out operation, and sequentially performs a fourth low conversion gain signal read-out operation and a fourth low conversion gain reset read-out operation.

9. The solid-state imaging device of claim 8, wherein, in the second conversion gain read-out mode, the reading part keeps an intensified voltage level of a control signal for the transfer element to make sure that the transfer element remains in a non-conduction state, in order to control the overflow charges during read-out, at least during the fourth low conversion gain signal read-out operation and during the fourth low conversion gain reset read-out operation.

10. The solid-state imaging device of claim 4, wherein the reading part:
is configured to, while the solid-state imaging device is operating in the rolling shutter mode and in the second conversion gain read-out mode, set and switch between (i) a second high conversion gain corresponding to the capacitance of the floating diffusion and (ii) a fourth low conversion gain corresponding to a sum of the capacitance of the floating diffusion, the first capacitance and the second capacitance; and
in the second conversion gain read-out mode, sequentially performs a fourth low conversion gain overflow (OF) signal read-out operation and a fourth low conversion gain OF reset read-out operation, and performs a second high conversion gain reset read-out operation and a second high conversion gain signal read-out operation.

11. The solid-state imaging device of claim 10, wherein, in the second conversion gain read-out mode, the reading part keeps an intensified voltage level of a control signal for the transfer element to make sure that the transfer element remains in a non-conduction state, in order to control the overflow charges during read-out, at least during the fourth low conversion gain signal read-out operation and during the fourth low conversion gain reset read-out operation.

12. The solid-state imaging device of claim 4, wherein the reading part:
is configured to, while the solid-state imaging device is operating in the rolling shutter mode and in the second conversion gain read-out mode, set and switch between (i) a first high conversion gain corresponding to the capacitance of the floating diffusion, (ii) a fourth low conversion gain corresponding to a sum of the capacitance of the floating diffusion, the first capacitance and the second capacitance, and (iii) a first medium conversion gain corresponding to a sum of the capacitance of the floating diffusion and the first capacitance; and
in the second conversion gain read-out mode, sequentially performs a first medium conversion gain reset read-out operation, a first high conversion gain reset read-out operation, a first high conversion gain signal read-out operation, a first medium conversion gain signal read-out operation, a fourth low conversion gain signal read-out operation, and a fourth low conversion gain reset read-out operation.

13. The solid-state imaging device of claim 12, wherein, in the second conversion gain read-out mode, the reading part keeps an intensified voltage level of a control signal for the transfer element to make sure that the transfer element remains in a non-conduction state, in order to control the overflow charges during read-out, at least during the fourth low conversion gain signal read-out operation and during the fourth low conversion gain reset read-out operation.

14. The solid-state imaging device of claim 4, wherein the reading part:
is configured to use the first capacitance selected from among the first and second capacitances to allow the each pixel to operate in the global shutter mode, and set and switch over to a fifth medium conversion gain corresponding to a sum of the capacitance of the floating diffusion and the first capacitance; and
while the solid-state imaging device is operating in the global shutter mode, sequentially performs a fifth medium conversion gain signal read-out operation and a fifth medium conversion gain reset read-out operation.

15. The solid-state imaging device of claim 4, wherein the reading part:
in a later half of a global shutter exposure period, equalizes reset levels of the floating diffusions of the pixels, then resets the floating diffusion and the first capacitance, and controls the stored charges to be transferred to the floating diffusion and the first capacitance; and
within a read-out waiting period, resets the floating diffusion to eliminate parasitic light sensitivity of the floating diffusion while the first capacitance is suspended from being accessed.

16. The solid-state imaging device of claim 4, wherein the reading part:
is configured to use the first and second capacitances to allow the each pixel to operate in the global shutter mode, and set and switch over to a fifth low conversion gain corresponding to a sum of the capacitance of the floating diffusion, the first capacitance and the second capacitance; and
while the solid-state imaging device is operating in the global shutter mode, sequentially performs a fifth low conversion gain signal read-out operation and a fifth low conversion gain reset read-out operation.

17. The solid-state imaging device of claim 16, wherein the reading part:
in a later half of a global shutter exposure period, controls the stored charges to be transferred to the floating diffusion, the first capacitance and the second capacitance; and,
within a read-out waiting period, resets the floating diffusion to eliminate parasitic light sensitivity of the floating diffusion.

18. The solid-state imaging device of claim 4, wherein the reading part:
is configured to use the first capacitance selected from among the first and second capacitances to allow the each pixel to operate in the global shutter mode and set and switch over to a fifth high conversion gain corresponding to a sum of the capacitance of the floating diffusion and the first capacitance; and
while the solid-state imaging device is operating in the global shutter mode, sequentially performs a fifth high conversion gain signal read-out operation and a fifth high conversion gain reset read-out operation.

19. The solid-state imaging device of claim 18, wherein the reading part:
in a later half of a global shutter exposure period, equalizes reset levels of the floating diffusions of the pixels, then resets the floating diffusion and the first capacitance, and controls the stored charges to be transferred to the floating diffusion and the first capacitance; and
within a read-out waiting period, resets the floating diffusion to eliminate parasitic light sensitivity of the floating diffusion while the first capacitance is suspended from being accessed.

20. The solid-state imaging device of claim 1, wherein, in the photoelectric conversion reading part,
the second storage connection element is connected to a connection node between the first storage connection element and the first capacitance element, and
a reset element is connected to a connection node between the second storage connection element and the second capacitance element.

21. The solid-state imaging device of claim 1,
wherein the photoelectric conversion reading part includes a third storage connection element for selectively connecting a connection node between the first storage connection element and the first capacitance element to the second capacitance element, and
wherein, in the photoelectric conversion reading part, the second storage connection element is connected between the photoelectric conversion element and the second capacitance element, and a reset element is connected to a connection node between the first storage connection element, the first capacitance element and the third storage connection element.

22. The solid-state imaging device of claim 1,
wherein the photoelectric conversion reading part includes a third storage connection element for selectively connecting the second storage connection element and the first capacitance element,
wherein, in the photoelectric conversion reading part, the first storage connection element is connected between the photoelectric conversion element and the first capacitance element, a connection node between the second storage connection element and the third storage connection element is connected to the floating diffusion, and a reset element is connected to a connection node between the second storage connection element and the second capacitance element.

23. The solid-state imaging device of claim 1, wherein the photoelectric conversion reading part includes a second reset element for resetting the floating diffusion to eliminate parasitic light sensitivity of the floating diffusion at least within a read-out waiting period.

24. The solid-state imaging device of claim 1, wherein the pixel part has
pixel sharing configuration in such a manner that one floating diffusion is shared between a plurality of photoelectric conversion elements and a plurality of transfer elements.

25. The solid-state imaging device of claim 1, wherein the photoelectric conversion reading part includes an overflow gate for discharging charges overflowing from the photoelectric conversion element.

26. The solid-state imaging device of claim 25,
wherein each of sharing pixels has the overflow gate connected to the photoelectric conversion element, the overflow gate being configured to allow the charges to be discharged from the photoelectric conversion element toward a region other than a region where the floating diffusion is formed, and
wherein the reading part is configured to control reading of the sharing pixels such that one or more of the sharing pixels employ a read-out mode where the charges are guided to overflow into the floating diffusion and remaining one or more of the sharing pixels employ a read-out mode where the charges are guided to overflow into a region other than the region where the floating diffusion is formed.

27. A method for driving a solid-state imaging device, the solid-state imaging device including:
a pixel part having pixels arranged therein, each pixel including a photoelectric conversion reading part, each pixel being configured to operate in a rolling shutter mode and a global shutter mode; and
a reading part for reading pixel signals from the pixel part,
wherein the photoelectric conversion reading part includes:
a photoelectric conversion element for storing therein, in an integration period, charges generated by photoelectric conversion;
a transfer element for transferring, in a transfer period following the integration period, the charges stored in the photoelectric conversion element;
a floating diffusion to which the charges stored in the photoelectric conversion element are transferred through the transfer element; and
a conversion signal reading part for amplifying a voltage signal produced through conversion with a conversion gain and outputting the amplified voltage signal,
wherein the solid-state imaging device is configured to operate (i) in a first conversion gain read-out mode where a readable signal is produced with at least one conversion gain associated with a capacitance of the floating diffusion and a first capacitance, and (ii) in a second conversion gain read-out mode where a readable signal is produced with at least one conversion gain associated with the capacitance of the floating diffusion, the first capacitance, and a second capacitance,
wherein whether the solid-state imaging device operates in the first conversion gain read-out mode or in the second conversion gain read-out mode is switched depending on a scene, and
wherein the photoelectric conversion reading part includes:
a first capacitance element, a capacitance of which serves as the first capacitance;
a second capacitance element, a capacitance of which serves as the second capacitance;
a first storage connection element for selectively connecting the floating diffusion and the first capacitance element; and
a second storage connection element for selectively connecting the floating diffusion and the second capacitance element.

28. An electronic apparatus comprising:
a solid-state imaging device; and
an optical system for forming a subject image on the solid-state imaging device,
wherein the solid-state imaging device includes:
a pixel part having pixels arranged therein, each pixel including a photoelectric conversion reading part, each pixel being configured to operate in a rolling shutter mode and a global shutter mode; and a reading part for reading pixel signals from the pixel part, wherein the photoelectric conversion reading part includes:

a photoelectric conversion element for storing therein, in an integration period, charges generated by photoelectric conversion;

a transfer element for transferring, in a transfer period following the integration period, the charges stored in the photoelectric conversion element;

a floating diffusion to which the charges stored in the photoelectric conversion element are transferred through the transfer element; and a conversion signal reading part for amplifying a voltage signal produced through conversion with a conversion gain and outputting the amplified voltage signal, the conversion signal reading part being configured to operate in a first conversion gain read-out mode and a second conversion gain read-out mode, the conversion signal reading part being configured to, while operating in the first conversion gain read-out mode, produce a readable signal with at least one conversion gain associated with a capacitance of the floating diffusion and a first capacitance, and the conversion signal reading part being configured to, while operating in the second conversion gain read-out mode, produce a readable signal with at least one conversion gain associated with the capacitance of the floating diffusion, the first capacitance, and a second capacitance, wherein the reading part is configured to switch whether the conversion signal reading part operates in the first conversion gain read-out mode or in the second conversion gain read-out mode depending on a scene, and wherein the photoelectric conversion reading part includes:

a first capacitance element, a capacitance of which serves as the first capacitance;

a second capacitance element, a capacitance of which serves as the second capacitance;

a first storage connection element for selectively connecting the floating diffusion and the first capacitance element; and a second storage connection element for selectively connecting the floating diffusion and the second capacitance element.

\* \* \* \* \*